US012654287B2

(12) United States Patent
Hanlon

(10) Patent No.: US 12,654,287 B2
(45) Date of Patent: Jun. 16, 2026

(54) VISE

(71) Applicant: JS Products Inc., Las Vegas, NV (US)

(72) Inventor: Jared W. Hanlon, Las Vegas, NV (US)

(73) Assignee: JS Products, Inc., Las Vegas, NV (US)

(*) Notice: Subject to any disclaimer, the term of this patent is extended or adjusted under 35 U.S.C. 154(b) by 435 days.

(21) Appl. No.: 18/141,459

(22) Filed: Apr. 30, 2023

(65) Prior Publication Data

US 2023/0347476 A1 Nov. 2, 2023

Related U.S. Application Data

(60) Provisional application No. 63/337,489, filed on May 2, 2022.

(51) Int. Cl.
*B25B 1/10* (2006.01)
*B25B 1/02* (2006.01)

(52) U.S. Cl.
CPC . *B25B 1/10* (2013.01); *B25B 1/02* (2013.01)

(58) Field of Classification Search
CPC ........... B25B 5/10; B25B 5/102; B25B 5/163; B25B 5/006; B25B 1/02; B25B 1/00; B25B 1/10; B25B 1/24; B25B 1/2484; B25B 1/2452
See application file for complete search history.

(56) References Cited

U.S. PATENT DOCUMENTS

| | | | | |
|---|---|---|---|---|
| 1,333,432 | A | | 3/1920 | Maier |
| 1,391,913 | A | | 9/1921 | Smith |
| 1,392,130 | A | | 9/1921 | Engstrom |
| 1,511,298 | A | | 10/1924 | Petzold |
| 1,753,924 | A | | 4/1930 | Gordon |
| 2,241,297 | A | * | 5/1941 | Ekstam ................. B25B 1/2405 269/107 |
| 2,260,995 | A | | 10/1941 | Kruczek |
| 2,703,028 | A | | 3/1955 | Goodwill |
| 2,734,409 | A | | 2/1956 | Schum et al. |
| 3,556,506 | A | | 1/1971 | Welker |
| 3,815,892 | A | | 6/1974 | Tulk |
| 4,243,212 | A | | 1/1981 | Bunyea et al. |
| 4,257,584 | A | | 3/1981 | Sterling |
| D282,143 | S | | 1/1986 | Tarquinio |
| 4,687,190 | A | * | 8/1987 | Yang ........................ B21J 19/04 269/239 |

(Continued)

FOREIGN PATENT DOCUMENTS

| | | |
|---|---|---|
| CN | 2625112 | 7/2004 |
| CN | 103372819 | 10/2013 |

(Continued)

OTHER PUBLICATIONS

Office Action and English Translation for China Patent Application No. 201680051266.6, mailed May 22, 2019, 28 pages.

*Primary Examiner* — Tyrone V Hall, Jr.
(74) *Attorney, Agent, or Firm* — Snell & Wilmer LLP

(57) ABSTRACT

A vise includes a pair of clamping jaws defining a cavity therebetween for holding a workpiece or tool, a primary screw for moving the pair of clamping jaws toward and away from one another, thereby allowing a workpiece or tool to be clamped in a first direction, and an anvil extending outwardly from a first clamping jaw of the pair of clamping jaws.

19 Claims, 20 Drawing Sheets

(56) References Cited

U.S. PATENT DOCUMENTS

| | | | | |
|---|---|---|---|---|
| 5,417,409 | A | 5/1995 | Reddell | |
| 5,433,356 | A | 7/1995 | Russell | |
| 6,595,508 | B2 | 7/2003 | Duncan | |
| D653,592 | S | 2/2012 | Brown | |
| D680,843 | S | 4/2013 | Onello et al. | |
| 8,540,225 | B2 | 9/2013 | Ehnstrom | |
| 9,079,464 | B2 | 7/2015 | Onello et al. | |
| D749,020 | S | 2/2016 | McFarland | |
| D802,490 | S | 11/2017 | McFarland | |
| 10,035,244 | B2 | 7/2018 | Onello et al. | |
| D837,698 | S | 1/2019 | Song | |
| 10,173,302 | B2 | 1/2019 | Schwaiger et al. | |
| 10,377,019 | B2 | 8/2019 | Onello et al. | |
| 11,565,377 | B2 | 1/2023 | Hanlon et al. | |
| 2003/0071405 | A1 | 4/2003 | Miksovsky | |
| 2010/0072240 | A1 | 3/2010 | Cornes | |
| 2015/0239098 | A1 | 8/2015 | Vincent | |
| 2019/0358777 | A1 | 11/2019 | Onello et al. | |
| 2023/0038808 | A1* | 2/2023 | Kuter-Arnebeck | B25B 1/02 |

FOREIGN PATENT DOCUMENTS

| | | |
|---|---|---|
| CN | 103817611 | 5/2014 |
| CN | 203579440 | 5/2014 |
| CN | 203636663 | 6/2014 |
| CN | 203650011 | 6/2014 |
| CN | 203712532 | 7/2014 |
| WO | 2013024498 | 2/2013 |

* cited by examiner

VISE

RELATED APPLICATION DATA

This application claims priority to U.S. Provisional Application Ser. No. 63/337,489, filed May 2, 2022, which application is incorporated by reference herein in its entirety.

FIELD OF THE INVENTION

The present invention relates to vises and similar types of clamping tools.

BACKGROUND OF THE INVENTION

Vises are well known, and are used to clamp tools and workpieces. However, most vises are relatively limited in their capabilities. For example, such vises may be able to clamp a workpiece or tool, and do nothing else. This is undesirable to users who want increased functionality from their vises. Additionally, traditional vises typically have jaw faces that connect to jaw bodies via a blind hole that is drilled and tapped, which is a huge problem because a slot and nut behind the screw is not easy to access. Furthermore, traditional vises are most often clamped in only one direction, which provides a relatively limited working parameter. There is, therefore, room for improvement in vises.

SUMMARY OF THE INVENTION

As one aspect of the invention, a vise includes a pair of clamping jaws defining a cavity therebetween for holding a workpiece or tool, a primary screw for moving the pair of clamping jaws toward and away from one another, thereby allowing a workpiece or tool to be clamped in a first direction, and an anvil extending outwardly from a first clamping jaw of the pair of clamping jaws.

As another aspect of the invention, a vise includes a clamping jaw, a mounting portion extending from the clamping jaw, a mounting tube removably coupled to and extending from the mounting portion, the mounting tube being configured to be secured to a support, and a primary screw coupled to the mounting portion and configured to cause the clamping jaw to move with respect to the mounting tube, the primary screw having an axis parallel to the mounting tube. The clamping jaw is movable with respect to the mounting tube in order to hold a workpiece or tool.

Further objects, features, and advantages of the present invention over the prior art will become apparent from the detailed description of the drawings which follows, when considered with the attached figures.

DETAILED DESCRIPTION OF THE INVENTION

Figure 1:
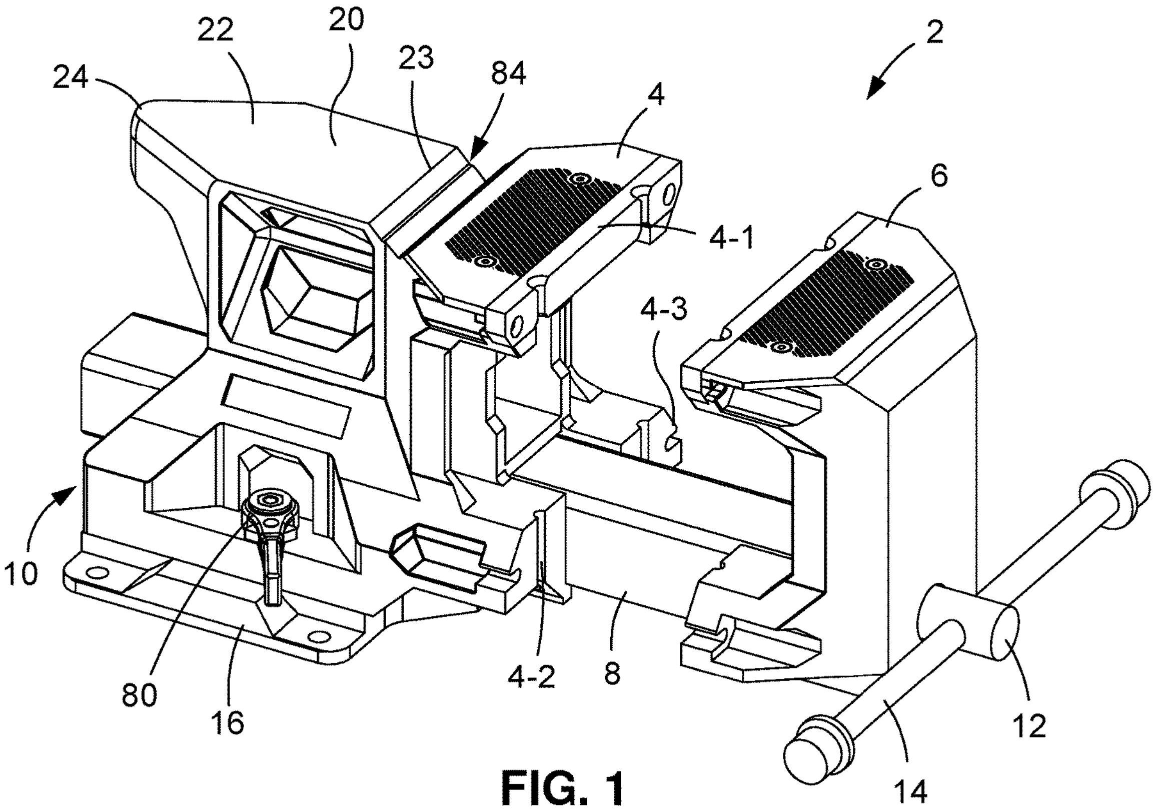
FIGS. 1, 2A, 2B, 2C, and 2D are front isometric, top, left side, front, and right side views, respectively, of a vise, in accordance with one non-limiting embodiment of the disclosed concept.
Figure 2A:
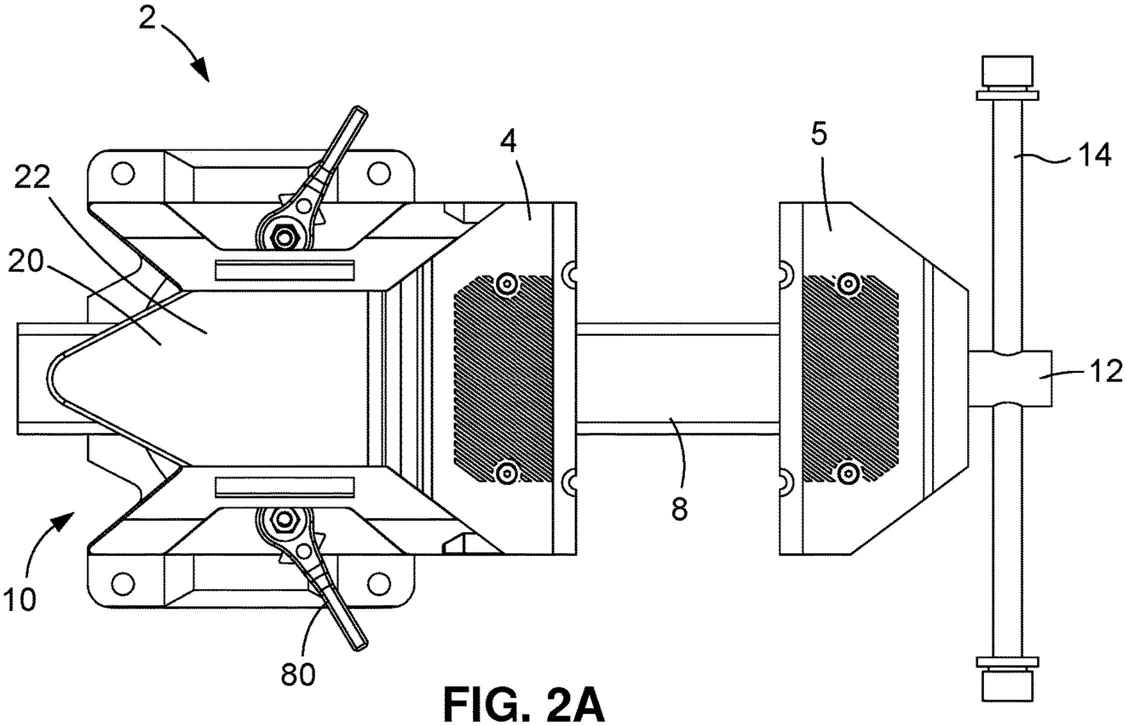
Figure 2B:
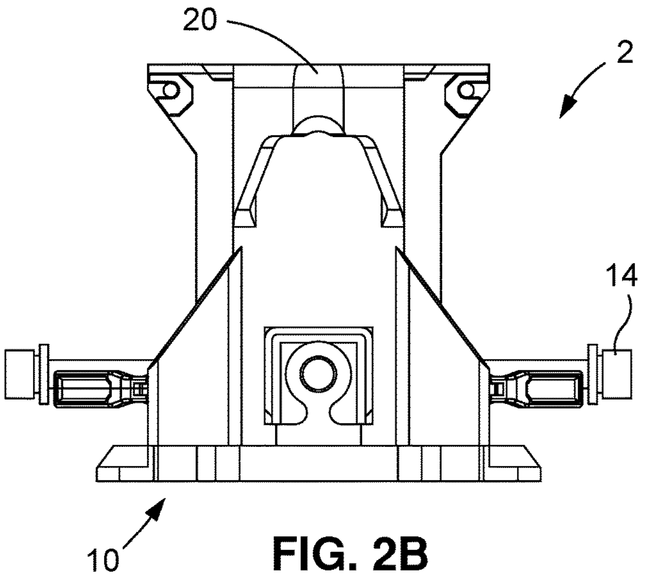
Figure 2D:
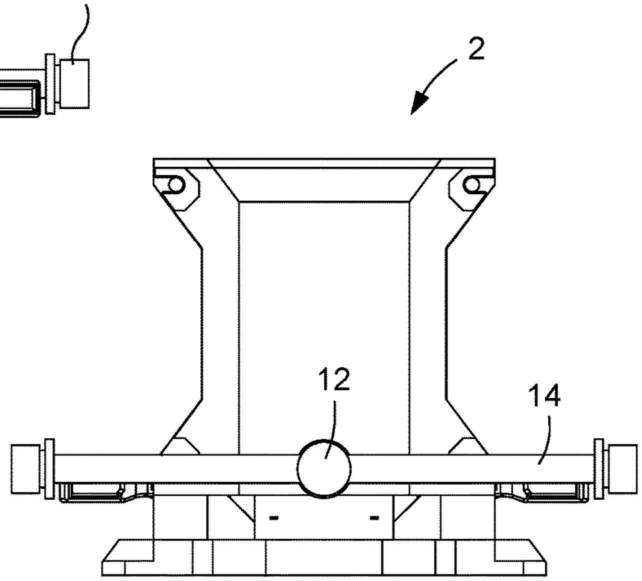
Figure 2C:
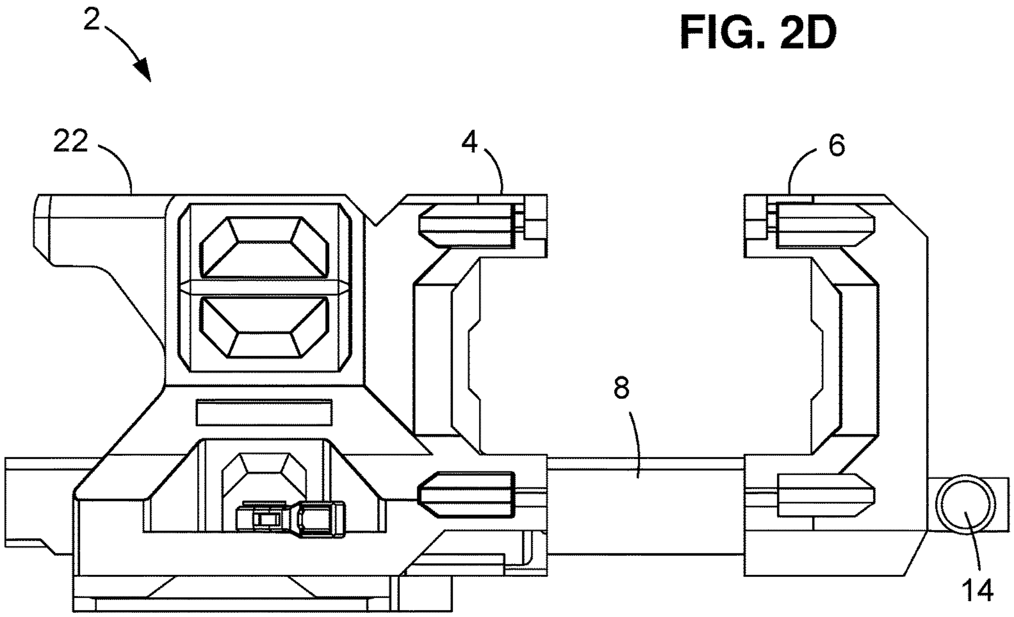

As employed herein, the term "coupled" shall mean connected together either directly or via one or more intermediate parts or components.

As employed herein, the term "anvil" shall mean a generally solid block of material (preferably metallic, such as made of iron or steel) which defines a top generally planar surface and preferably includes an outwardly extending horn), on which materials (workpieces, etc.) are configured to be shaped (such as by hammering, etc.)

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

FIGS. 1-9 show different views of a vise 2, in accordance with one non-limiting embodiment of the disclosed concept. In general, the vise 2 has a first jaw 4 and a second jaw 6, where the first and second jaws 4,6 are movable relative to one another, such as where the first jaw 4 is fixed and where the second jaw 6 is movable towards and away from the first jaw 4. Additionally, it will be appreciated that the first and second jaws 4,6 may define a cavity therebetween for holding a workpiece or tool.

In one configuration, the second jaw 6 is movably mounted on a slide or track 8, such as which extends outwardly from a body 10 of the vise 2 (to which the first jaw 4 is connected). The slide 8 may, for example, comprise an elongated, inverted "U" shaped metal support. The second jaw 6 may be slidable along the slide 8, such as by turning a spindle screw 12 or other drive element, such as with a handle 14. In one example, the screw 12 is a primary screw that is configured to move the clamping jaws 4,6 toward and away from one another, thereby allowing a workpiece or tool to be clamped in a first direction. The handle 14 may be connected to a first end of the spindle screw 12, such as which extends outwardly from an end of the slide 8. The second end of the spindle screw 12 may engage a fixed threaded mount, such as connected to the slide 8. The second jaw 6 may engage the spindle screw 12, whereby rotation of the spindle screw 12 causes the second jaw 6 to threadingly move there along towards or away from the first jaw 4.

In one configuration, the first or fixed jaw 4 is mounted to or is integral with the body 10. The body 10 may be connected to or include a base 16. As described below, the base 16 may be configured to facilitate connection of the vise 2 to a support or supporting surface, and may also permit rotation of the vise 2 to different angular positions. Furthermore, the body 10 may be configured to support an anvil 20 and allow the anvil 20 to be squared with a structure on which the anvil 20 is mounted.

In this regard, as one aspect of the invention, the vise 2 may include an anvil 20 extending outwardly from the first clamping jaw 4. The anvil 20 may, for example, comprise a portion of the body 10, such as by being integrally formed therewith and with the first jaw 4. In other embodiments, the anvil 20 might be connected to the body 10.

As shown, the anvil 20 has preferably has a work surface 22 that is level with (e.g., parallel with), or coplanar with, a top surface of at least the adjacent fixed jaw 4. This advantageously makes a larger clamping surface and anvil working surface. Additionally, having the anvil 20 integrated into the vise 2 provides increased capability to users who desire to do more than simply clamp workpieces or tools with their vise. Moreover, in one example, as shown in FIG. 1, the work surface 22 has an edge 23 and a corner 24 located opposite the edge 23. The edge 23 may be located between the corner 24 and the first clamping jaw 4.

Figure 3:
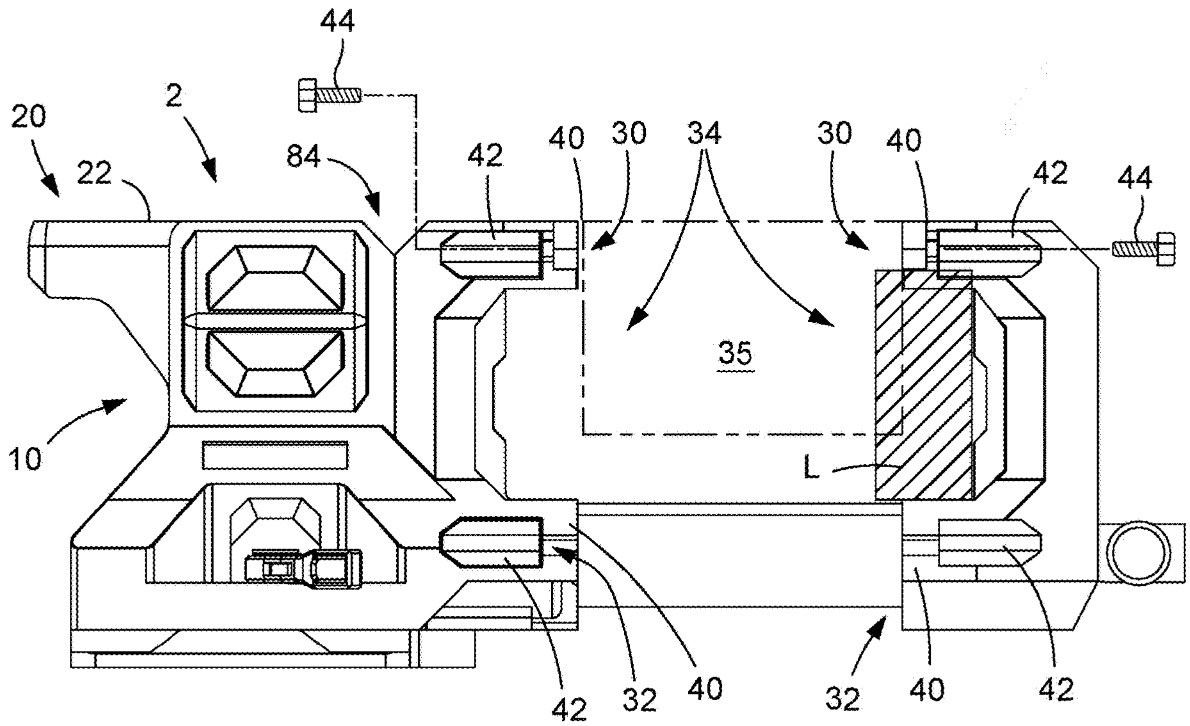
FIG. 3 is another front view of the vise of FIG. 1, shown in a different position, and shown with a piece of lumber coupled to one of the jaws.
Figure 4:
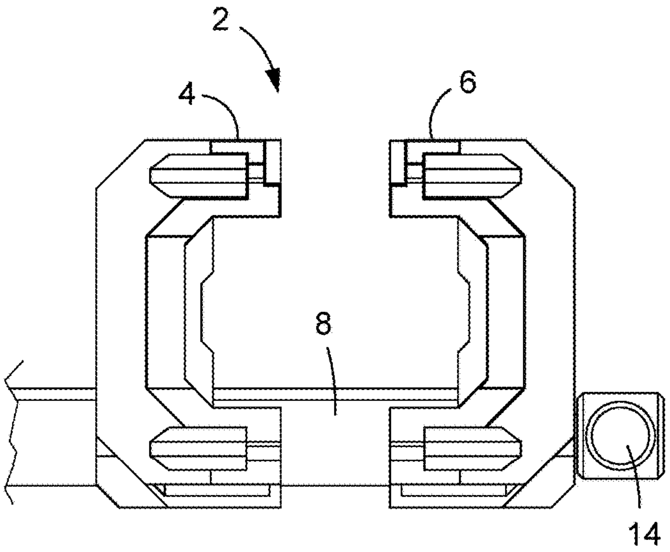
FIG. 4 is another front view of the vise of FIG. 1.

As best illustrated in FIG. 3, in one configuration, the first and second jaws 4,6 are generally C-shaped such that the pair of clamping jaws 4,6 are concave facing each other. The jaws 4,6 may also have an outwardly extending top or upper clamping portion 30, an outwardly extending bottom or lower clamping portion 32 (which may have one part located on one side of the slide 8 and another part located on the other side of the slide 8), and a generally recessed or inset area 34 therebetween. In this configuration, when the first and second jaws 4,6 are moved together, the top and bottom clamping portions 30,32 of the jaws contact one another, while an open space or intermediate opening 35 is defined between the jaws 4,6 (see FIG. 6), which space extends laterally through the jaws.

The inset area 34 defined by each jaw 4,6 is, in one embodiment, configured to receive a standard two by four inch (2×4 cross-sectional dimensioned) piece of lumber L (or similarly sized other type of body, such as a rubber or plastic block, etc.), placed perpendicular to the jaw 4,6, thereby making for a crush zone when clamping items that a user does not want to damage, as will be discussed below. In this regard, the height of the insert 34 is preferably at least as great as the height of a 2×4 piece of lumber L (and preferably only slightly larger), and the depth is preferably slightly less than the width of a 2×4 piece of lumber L, whereby the piece of lumber L extends outwardly beyond the top and bottom clamping portions 30,32. In other embodiments, the inset 32 might be configured to accept lumber or other workpiece of other sizes (2×6, 4×4, etc.).

In one configuration, the first and second jaws 4,6 each have removable jaw faces or inserts 40 that are removably coupled to bodies of the jaws 4,6. The jaw faces 40 are located at the top and bottom clamping portions 30,32. A problem with existing vises is that a jaw face may be connected via a blind hole that is drilled and tapped, making access to the associated fastener difficult. As illustrated, an ear and slot type connection point is employed for the jaw faces 40. In particular, an open slot 42 is formed in the side of the body of the jaws 4,6. An ear is formed at an end of the slots 42. A fastener 44 may be located in the slot 42 and passed through the ear and into engagement with the jaw face 40, thereby removably connecting it to the jaw 4,6 (such an ear and slot configuration may be located on each side of the top and bottom clamping portion 30,32 of each jaw 4,6). Additionally, second open slots 42 may be formed in other sides of the bodies of the jaws 4,6, wherein second ears are formed in the second open slots 42, and second fasteners 44 may be located in the second open slots 42 and extending through the second ears, such that each the of the clamping jaws 4,6 are configured the same as each other.

By having easy access to the slot 42 and a nut behind the screw/fastener 44, no secondary drilling operation is needed. The slot 42 advantageously makes it easy to swap out the jaw faces 40 with other ones, such as having different clamping features/shapes/materials, etc.

In the configuration described, the jaws 4,6 generally define three main clamping areas or surfaces. Having the ability to clamp an item in both the horizontal and vertical orientations by engagement with two or more of the three main clamping surfaces per jaw means that an item can be securely placed in the first and second jaws 4,6 in any orientation, keeping the item being clamped from moving while being worked on. In one example, each of the clamping jaws 4,6 includes three clamping surfaces. FIG. 1, for example, shows the first, second, and third clamping surfaces 4-1,4-2,4-3, each of which are spaced from one another. It will be appreciated that the second clamping jaw 6 similarly includes first, second, and third clamping jaws each of which are configured to face the first, second, and third clamping surfaces 4-1,4-2,4-3 of the first clamping jaw.

Figure 5A:
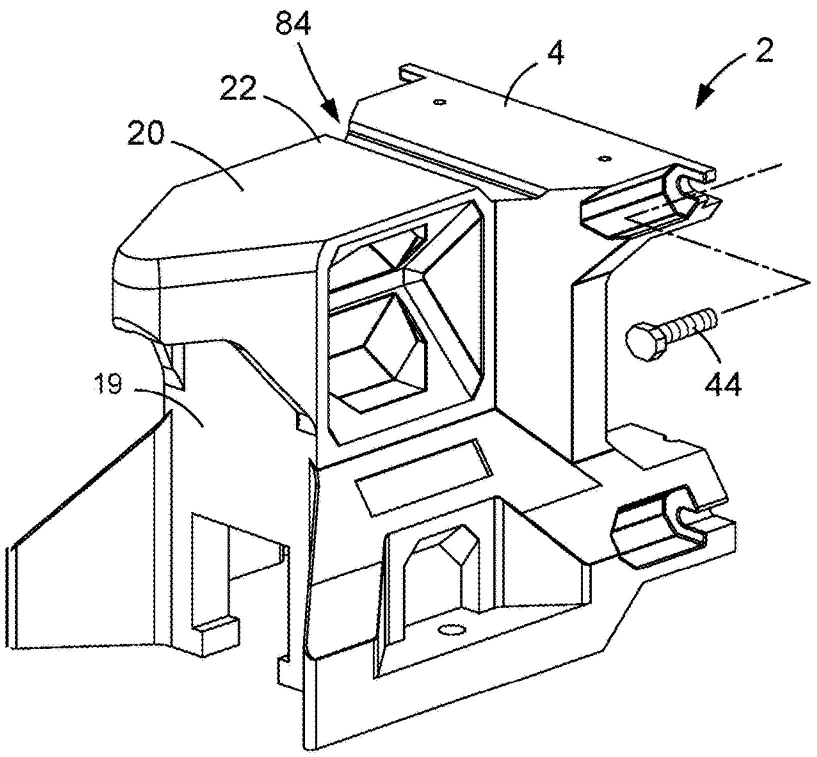
FIGS. 5A and 5B are different section views of the vise according to FIG. 1.
Figure 5B:
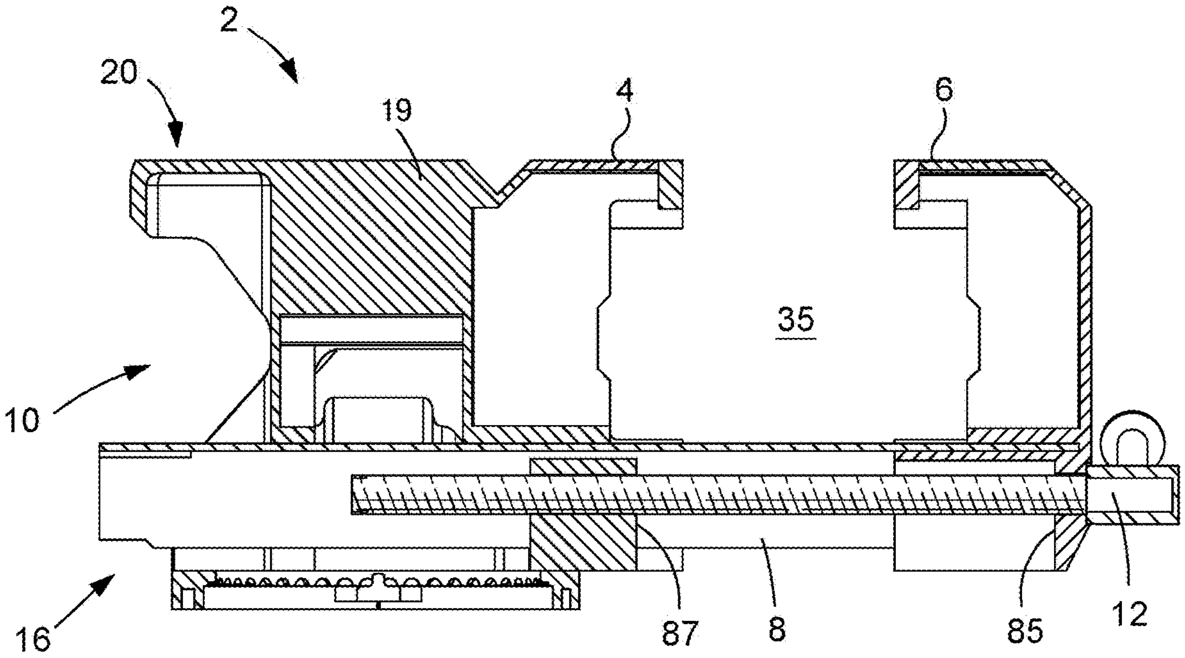
Figure 6:
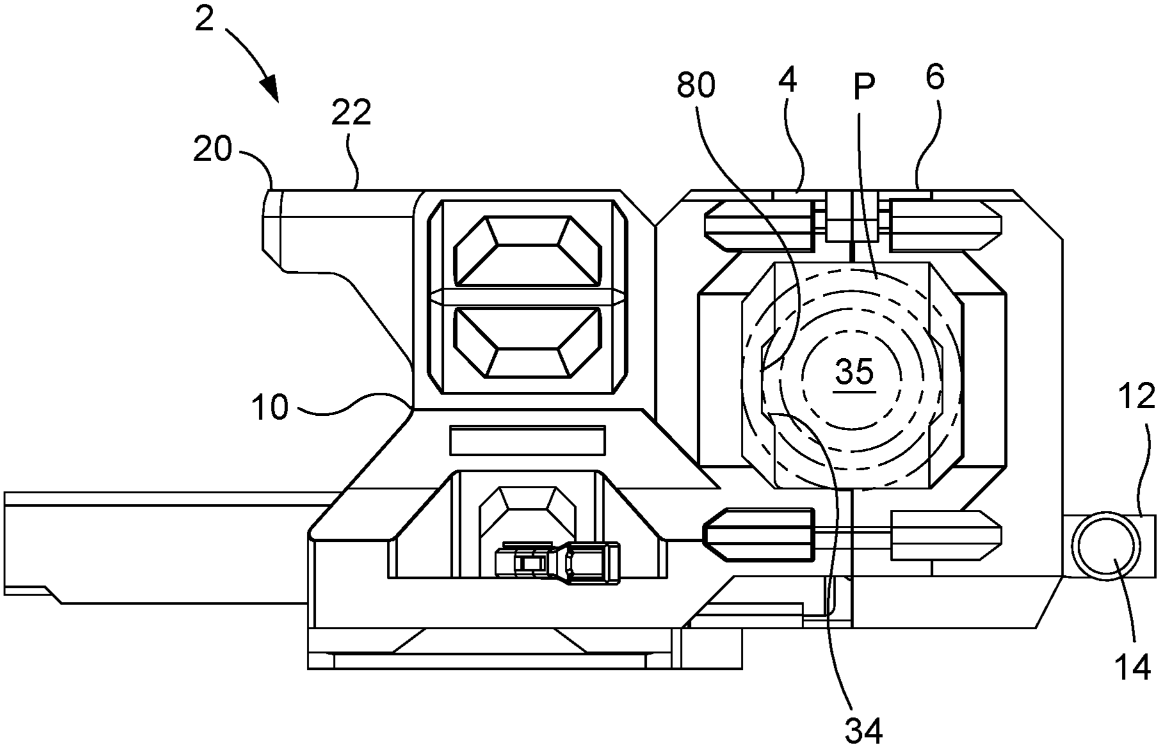
FIG. 6 is another front view of the vise according to FIG. 1, shown with the vise in a closed position.

FIGS. 5A and 5B are cross-sectional views of an embodiment of the body 10 with associated anvil 20. In this configuration, the body 10, including the anvil 20, generally has a support 19 extending from the work surface 22 away therefrom, and the support 19 has an I-shaped cross-section (e.g., a generally wide top, central vertical support and generally wide bottom). It will be appreciated that the I-shaped cross-section makes the body 10, including the anvil 20, very strong. At the same time, the body 10, including the anvil 20, may easily be cast (and have lightening holes around the beam construction, thus reducing the overall weight of the vise 2). As illustrated in FIGS. 5A-5B, a wall thickness of the body 10, including the anvil 20, may be increased to provide increased strength.

Figure 7A:
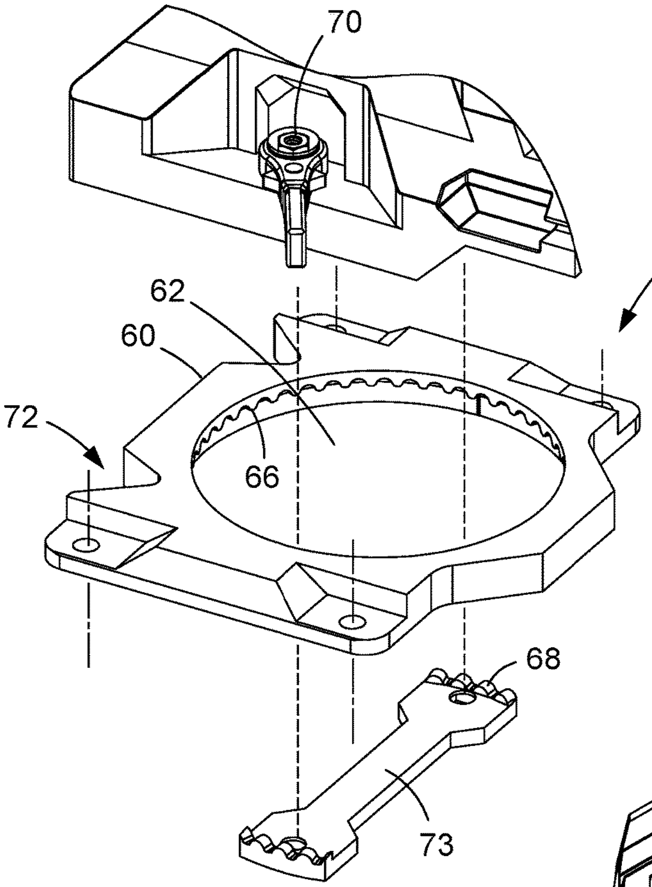
FIG. 7A shows an exploded view of a mounting plate and a locking bar for the vise according to FIG. 1.
Figure 7B:
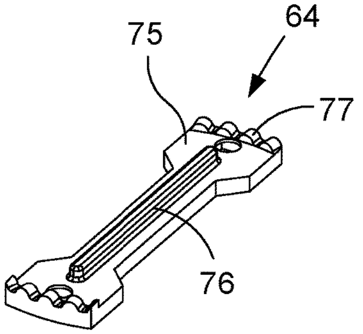
FIG. 7B shows another locking bar which may be used with the vise of FIG. 1.

As shown in FIGS. 7A and 7B, a base 16 of the vise may comprise a mounting plate 60 and a locking bar 73 connected to the mounting plate 60. In one example, the mounting plate 60 is annular-shaped. The mounting plate 60 may, in one configuration, be quadrilateral in shape, such as square or rectangular where adjacent sides are at 90 degree angles relative to one another. In such a configuration, the vise 2 may be squared to a mounting structure by aligning the sides with the mounting structure.

In one configuration, means are provided for movably joining the body 10 of the vise 2 to the base 16. This means may permit the position of the body 10 to be changed relative to the base 16. In one embodiment, the mounting plate 60 is annular-shaped, and may define an opening 62. Furthermore, the means for movably mounting may include mating teeth associated with the mounting plate 60 and the locking bar 73. Thus, as illustrated in FIGS. 7A and 7B, the mounting plate 60 has a plurality of teeth 66 associated therewith, such as extending downwardly around the opening 62. These teeth 66 are configured to engage mating teeth 68 associated with the locking bar 73 in order to minimize the likelihood that the locking bar 73 will become disengaged from the mounting plate 60. In other example, as shown in FIG. 7B, another locking bar 64 includes an element 75 which has a longitudinal rib 76 provided thereon for strength, and teeth 77 extending outwardly therefrom. It will be appreciated that the locking bar 64 may be substituted into the vise 2 for the locking bar 73.

The body 10 of the vise 2 is preferably connected to the locking bar 73 (e.g., or the locking bar 64), whereby a change in position of the locking bar 73 relative to the mounting plate 60 effectively changes a positional angle of the vise 2. See FIG. 8, for example. In one configuration, the locking bar 73 may be moved into and out of engagement with the mounting plate 60 to either allow the position of the vise 2 to be adjusted, or to lock it in a fixed position. In one embodiment, the position of the locking bar 73, such as tightened against or loosened relative to, the mounting plate 60, may be adjusted by at least one lever 80 (see FIG. 1). This lever 80 may be located at an accessible portion of the body 10 of the vise 2, and may, for example, be movably mounted and configured to adjust a position of the locking bars 64,73 with respect to the mounting plate 60. In one example, the work surface 22 of the anvil 20 may be located in a plane, and the lever 80 may be configured to rotate about an axis perpendicular to the plane.

The teeth 66 on the bottom of the mounting plate 60 preferably have a relatively large tooth pattern (e.g., are relatively wide and tall). This reduces the possibility that the locking bar 73 will become disengaged from the mounting plate 60, such as when forces are applied to the vise 2 (such as the anvil 20) which are transmitted through the body 10.

In one embodiment, as shown in FIG. 7A, the mounting plate 60 may be connected to a support or supporting surface, such as by one or more fasteners, such as bolts 70. The bolts 70 (such as associated mounting holes therefor) may be disposed on an outside of the mounting plate 60 in order to provide a more stable mounting.

As illustrated, the tops of the fasteners, such as the bolts 70, may be recessed, such as relative to one or more ears 72. The ears 72 may extend rearwardly from the mounting plate 60 are support the body 10 of the vise (including the anvil 20) and prevent the bolts 70 from being hit during normal use, further adding additional strength to the base.

Figure 8:
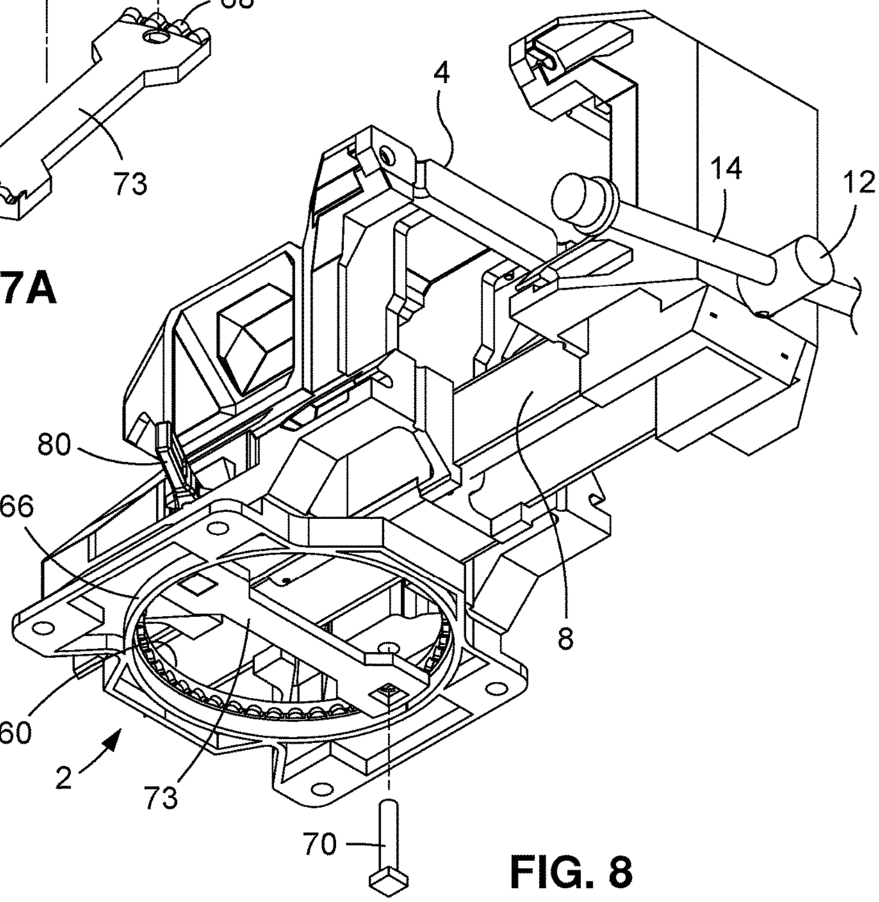
FIG. 8 shows a rear isometric view of the vise according to FIG. 1, and shows the mounting plate and locking bar of FIG. 7A, shown coupled to the vise.
Figure 9:
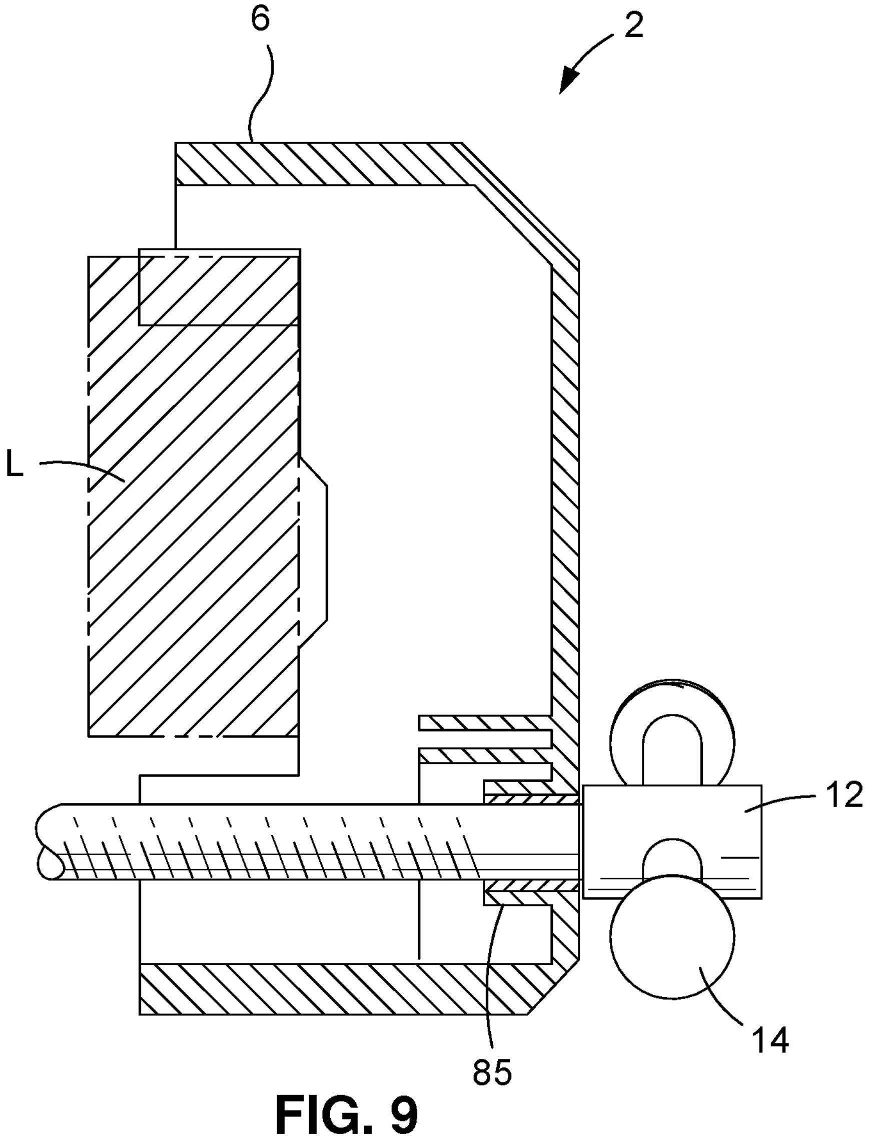
FIG. 9 shows a section view of a portion of the vise according to FIG. 1.

It can also be appreciated with reference to FIG. 8 that in the configuration described, the vise 2 may swivel 360 degrees around the mounting plate 60, thus permitting a wide range of positional adjustment. Further, as illustrated, the locking bar 64 may have the optional protrusion, such as a rib 74 (FIG. 7B) for increased strength (against bending).

As described above and further shown in FIG. 3, the jaws 4,6 may each have upper or top and lower or bottom clamping portions 30,32. This gives users more options for clamping their tools and workpieces when using the vise 2. In one embodiment, as can be seen more clearly in FIG. 6, the clamping jaws 4,6 may have slots or insets 80, such as at the inset portions 34, such as extending horizontally and transversely. These slots 80 may allow a conduit, pipe, rod or the like (e.g., a standard 2½" OD pipe P) to be clamped between the jaws 4,6. In one embodiment, the jaws 4,6 may facilitate inserts having different thicknesses or depths of insets 80, thus permitting the jaws 4,6 to accept pipes or similar object of other specific dimensions (such as when the jaws 4,6 are closed).

FIG. 3 shows additional aspects of the vise 2. FIG. 3 shows use of a wood insert L (such as the above-referenced 2×4 piece of wood/lumber) set into the inset portion 34 of one of the jaws 4,6. In FIG. 3, the wood template L is depicted with cross hatching. It will be appreciated that the wood template L may be placed in each jaw 4,6.

FIG. 8 illustrates the locking lever 80 which is used to adjust the locking bar of the swivel mount (described above). As illustrated, a locking lever 80 may be provided on each side of the vise 2, where each lever 80 engages one end of the locking bar. The locking levers 80 may be located at an inset portion of the body 10 and have a length which prevents them from substantially protruding beyond the body 10, thus protecting them from being broken (such as by a glancing hammer blow when a user is using the anvil 20).

FIG. 3 further illustrates the slots 42 and bolts 44 that are accessible at the sides of the jaws 4,6 and which permit the jaw faces or inserts 40 to be connected to disconnected. Specifically, as shown, the internal face of the slot 42 prevents the nut from rotating to allow the jaw faces or pads 40 to be installed more easily.

Additionally, as shown in FIG. 1, the vise 2 may include a slot or groove 84 at the top thereof, such as separating the work surface 22 of the anvil 20 and the top surface of the first jaw 4, or in a portion of those components. This groove 84 is configured to accept workpieces, and particularly round workpieces, such as pipes.

FIG. 3 shows the jaws 4,6 including an inset between upper and lower clamping portions, such as for accepting a wood template L.

FIG. 5B illustrates details of the spindle screw 12, including a spindle guide 85 which is associated with (such as which extends into) the second jaw 6 (see also FIG. 9), and another spindle guide 87 which is associated with the first jaw 4, thus maintaining the spindle screw 12 in an aligned position (parallel to an axis through the slide 8).

Figure 10A:
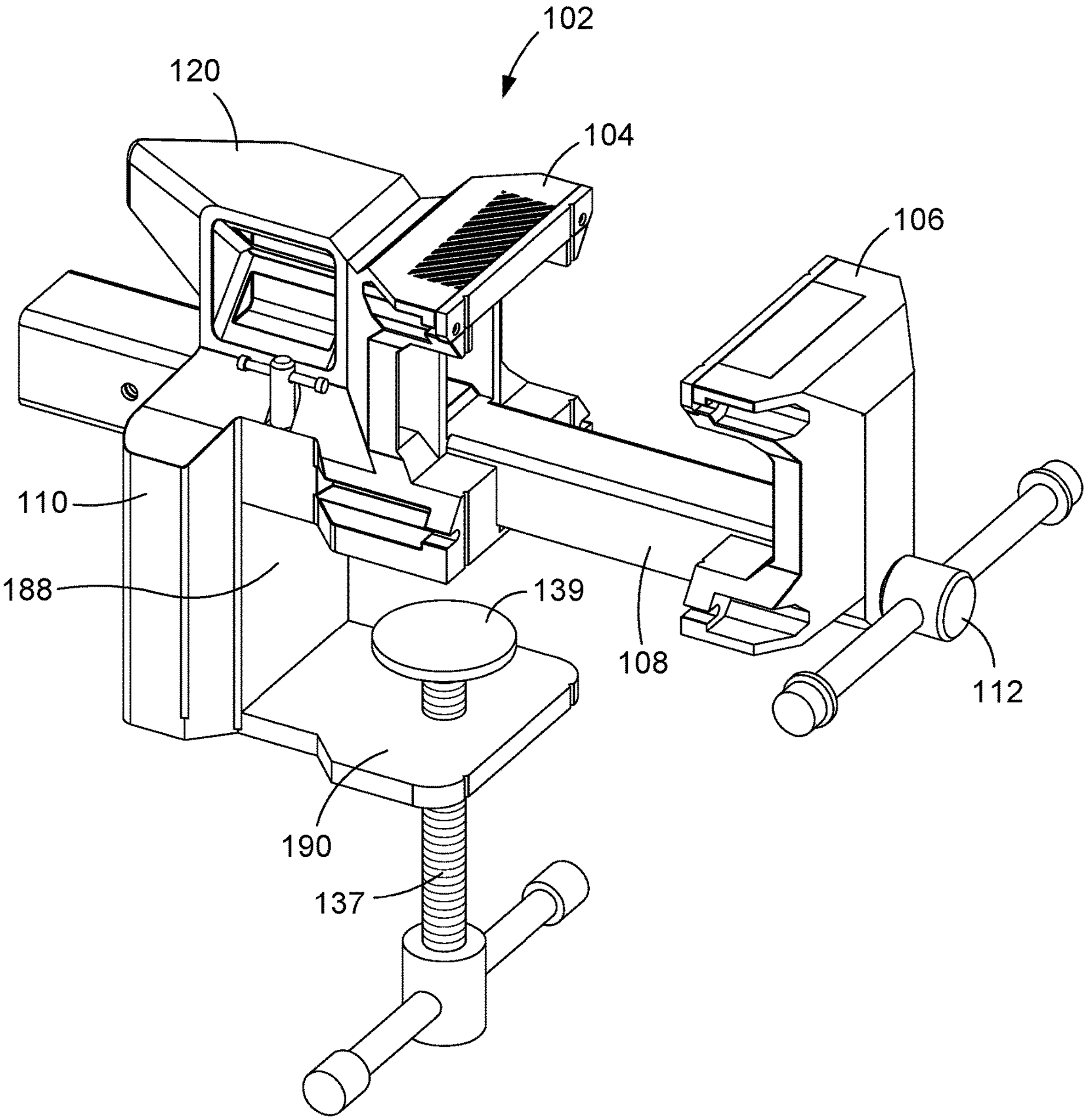
FIGS. 10A, 10B, and 10C are front isometric, top, and front views, respectively, of another vise, according to another non-limiting embodiment of the disclosed concept.
Figure 10B:
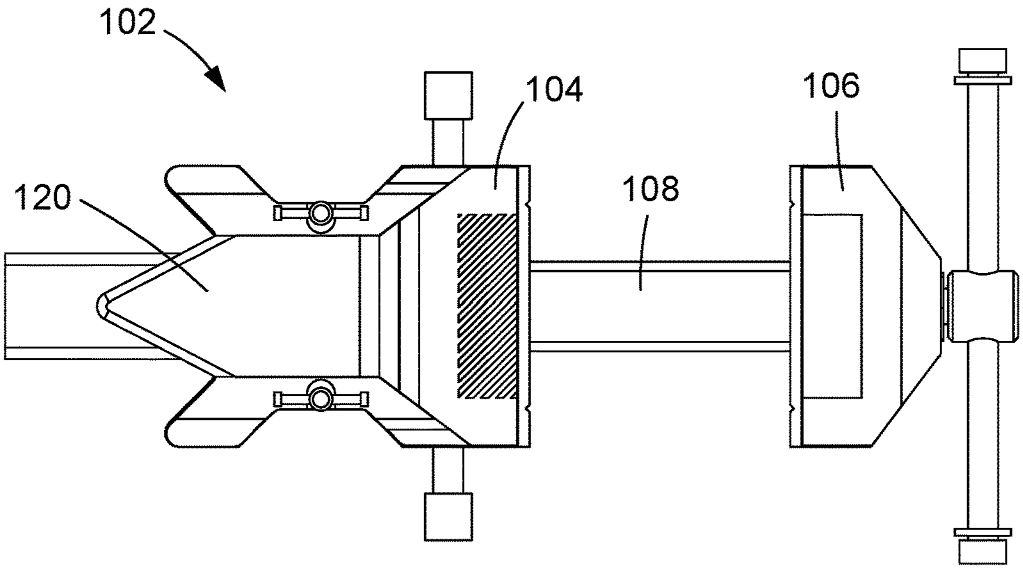
Figure 10C:
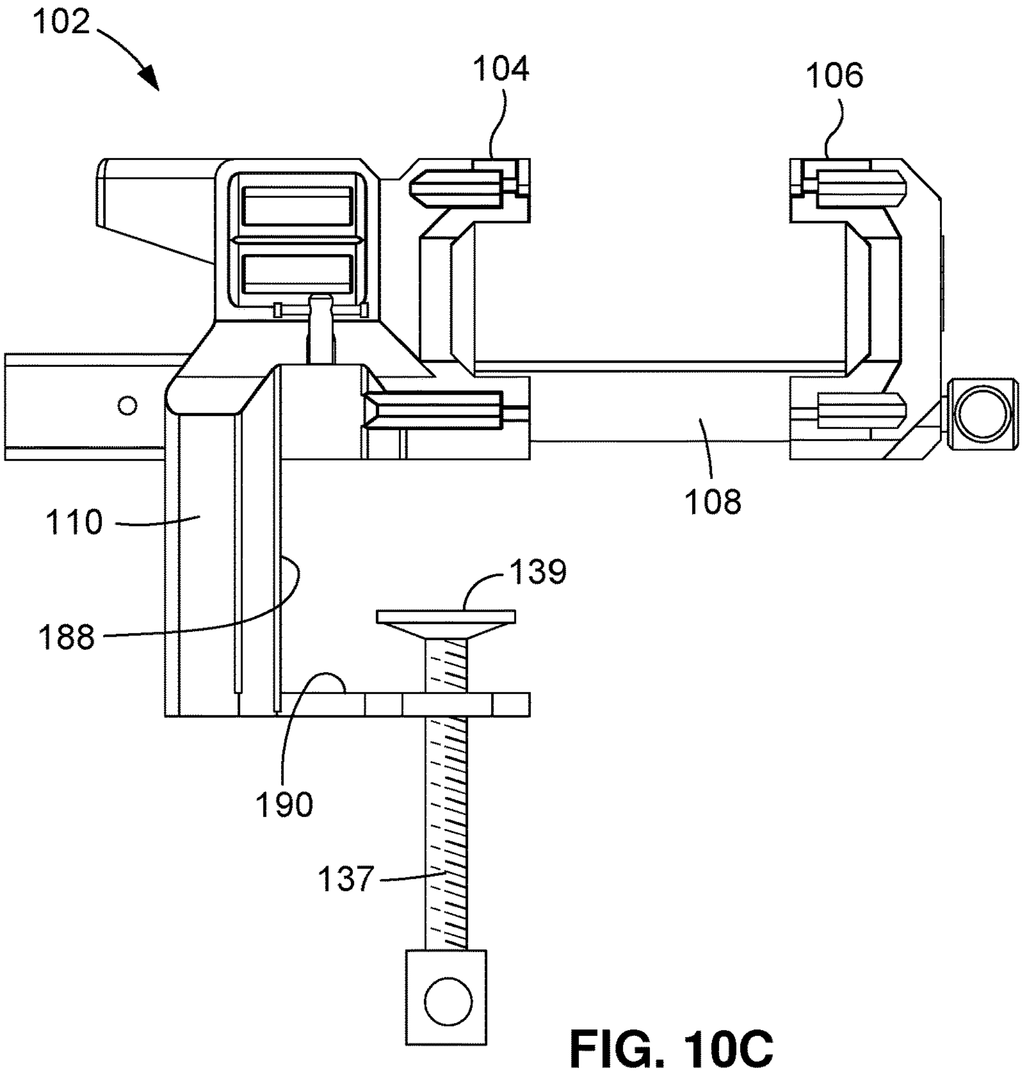

FIGS. 10A-10C show another vise 102, similar to the vise 2 discussed above, wherein like numbers represent like features. This vise 102 may be referred to as a project vise, as it is configured to be mounted (such as clamped) to a workbench or similar work element. The vise 102 may include an anvil 120 extending outwardly from the jaw 104.

As shown in FIGS. 10A and 10C, the body 110 of the vise 102 may have a downwardly extending extension 188 and an associated mount 190 (such as which is spaced from the bottom portion of the first jaw 104) extending generally perpendicular to the extension 188. Means may be provided for connecting or securing the vise 102 to a support. This means may comprise a secondary screw 137 (e.g., in addition to the primary screw 112) that extends through the mount 190 and allows the vise 102 to be clamped to a support (e.g., most benches). In one example, the primary and secondary screws 112,137 each have an axis, and the axis of the primary screw 112 is located perpendicular to the axis of the secondary screw 137.

Extending from an end of the secondary screw 137 is a pad (e.g., rubber pad 139 shown in FIG. 10D) that protects the support on which the vise 102 is clamped. In one configuration, the jaw faces or inserts may comprise rubber or other non-marring material. Other adjustable mounting elements might be utilized.

FIGS. 11A-11D show views of another vise 202 similar to the vises 2,102, discussed above, wherein like reference numbers represent like components. This vise 202 may comprise a bench vise. This vise 202 illustrates another configuration of a means for moving the second jaw 206, wherein the second jaw 206 is mounted to slides 208, such as rods, which extend therefrom and slidably engage the base 210 at opposing sides thereof. Again, a spindle screw 212 may be used to move the second jaw 206.

Figure 11A:
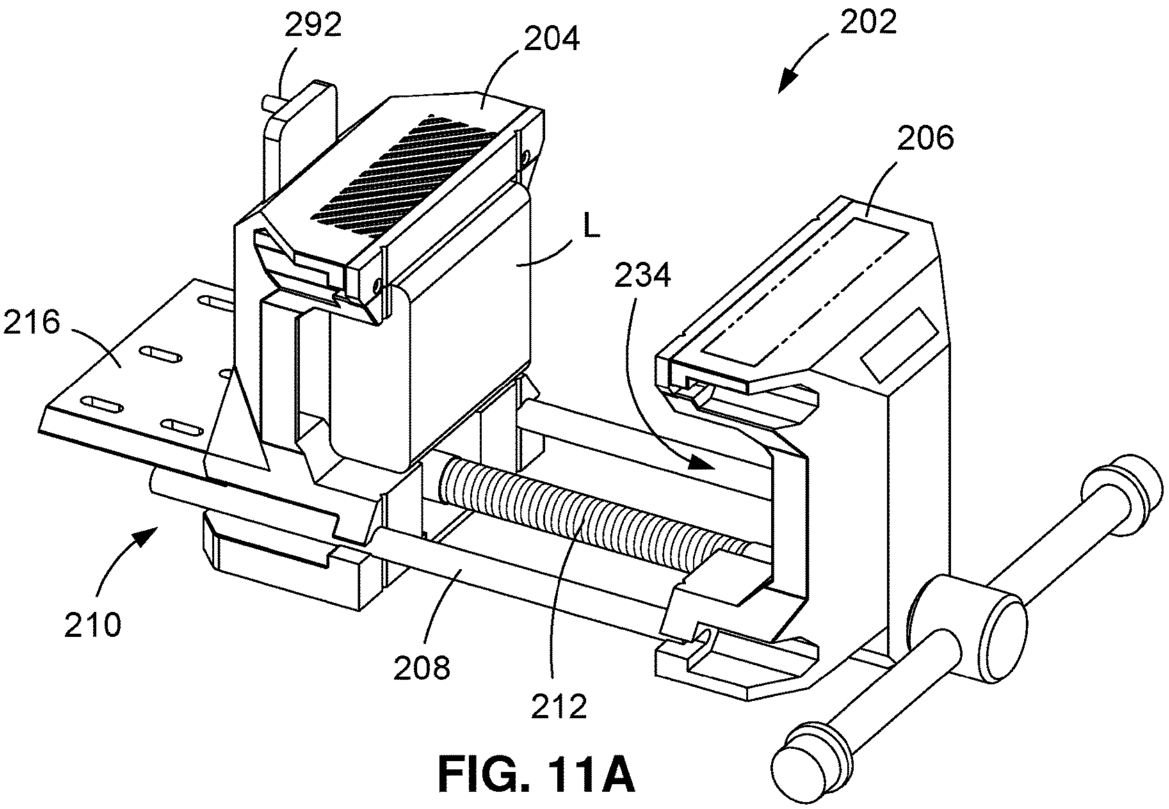
FIGS. 11A, 11B, 11C, and 11D are front isometric, top, front, and section views, respectively, of another vise, according to another non-limiting embodiment of the disclosed concept.
Figure 11B:
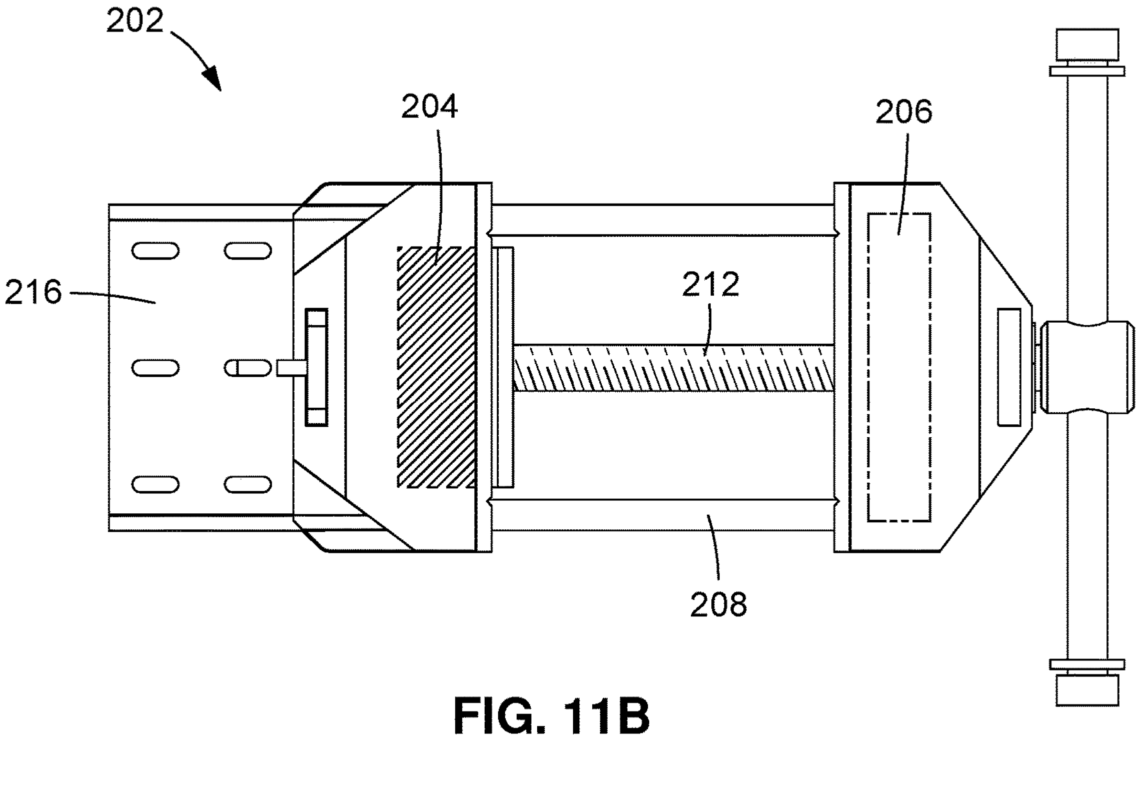
Figure 11C:
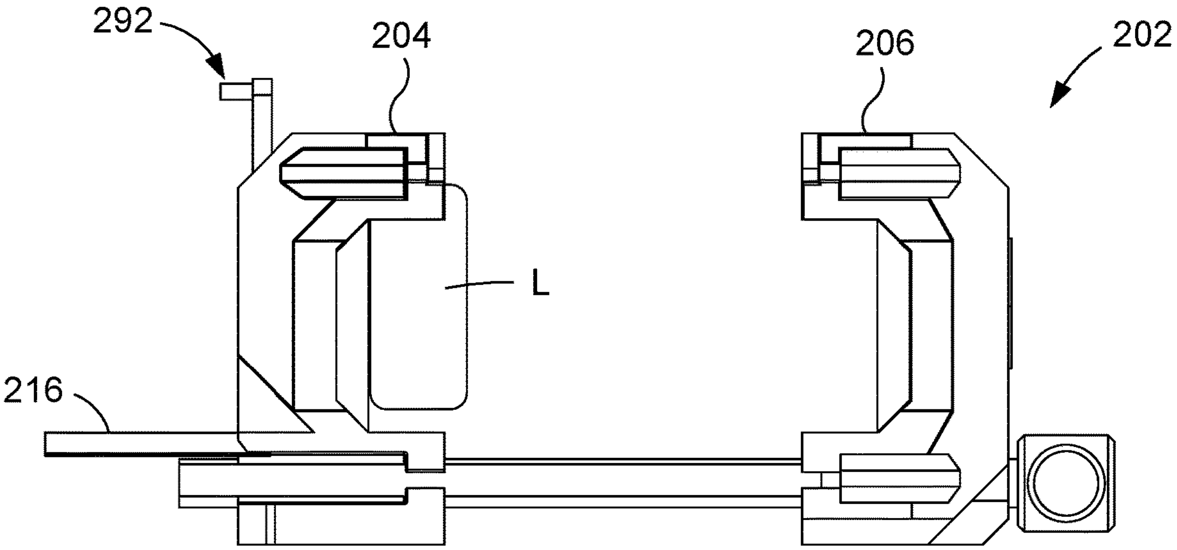
Figure 11D:
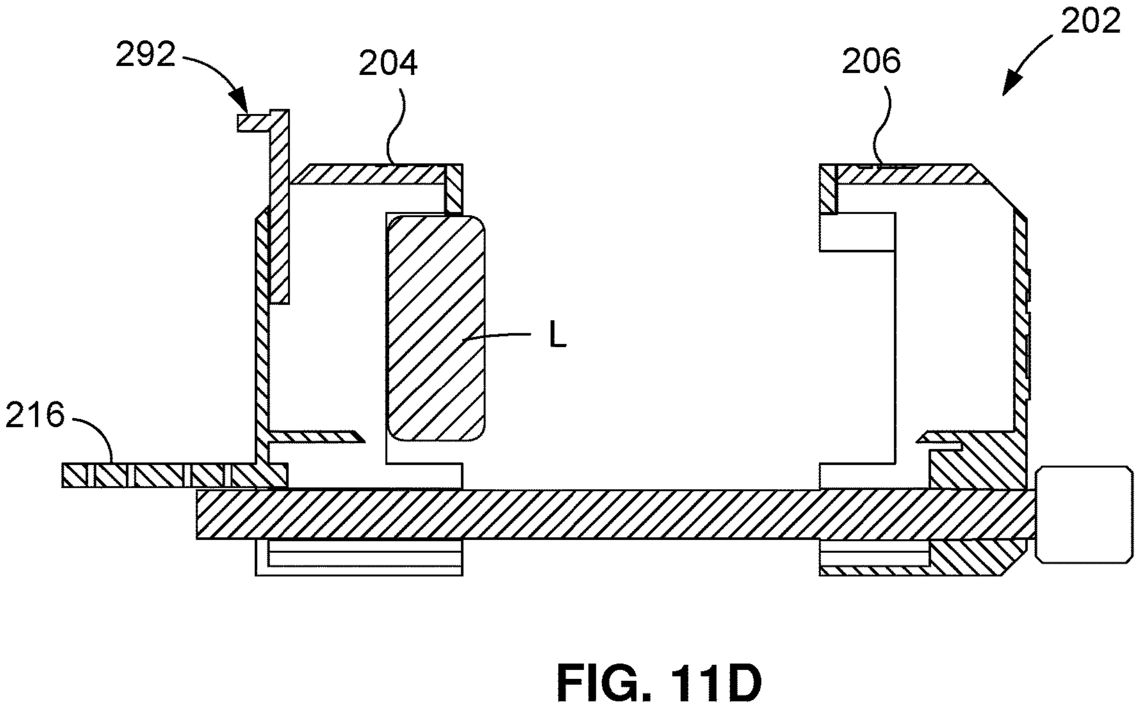

As shown in FIG. 11A, the insets 234 of the jaws 204,206 allow a standard wood block or piece of lumber L (e.g., 2×4 sized lumber) to be placed therein in order to prevent damage to an the item being clamped. In another configuration a 2×6 can be used as well, such as to extend upwardly to cover the front of the upper jaw portion of the jaw.

Referring to FIG. 11A, the vise 202 may include one or more dogs, such as pull up dogs 292 that can act as a stop, thus adding another clamping option/location (such as the vise 202 is mounted with the jaws 204,206 even with the work surface/tabletop). As illustrated, the pull up dog 292 or other extension or body may be movable between a raised or extended position, such as relative to one of the jaws 204,206 (a dog is shown as associated with the first jaw 204, but could alternately or additionally be provided relative to the second jaw 206). Such a dog 292 may be associated with the jaw itself, or other portion of the vise 202, such as the base 210. The one or more dogs 292 may move vertically, rotate or the like, to permit them to be moved between an extended working position and a retracted position. As illustrated, in one configuration, the dog 292 may extend outwardly beyond a portion of one of the jaws to provide a stop surface (such as above the jaw, to one side, etc.)

The vise 202 may be mounted to a supporting surface, such as a workbench, such as via connection of the base 210 thereto with one or more fasteners. The vise 202 may also include a mounting plate 216 for supporting workpieces or other items, and/or for additional use in securing the vise. As illustrated, the mounting plate 216 may be a part of the body 210.

Figure 12A:
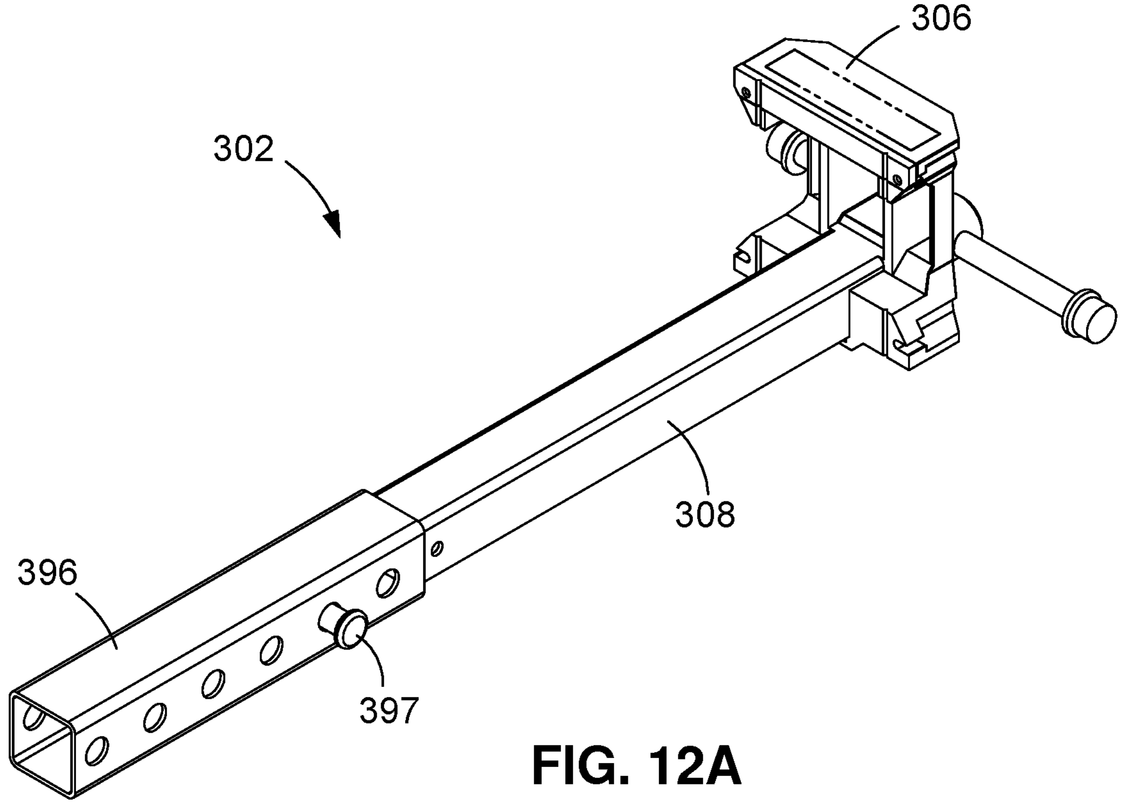
FIGS. 12A and 12B are front isometric and front views, respectively, of another vise, according to another non-limiting embodiment of the disclosed concept, shown with one of the jaws removed in FIG. 12A.

FIG. 12A shows another vise 302 similar to the vises 2,102,202 discussed above, wherein like reference numbers represent like components. This vise 302 may, for example, be particularly suited for use as a woodworking vise.

As shown in FIG. 12A, the vise 302 may include just a movable or second jaw 306, such as extending from and/or movably located on a mounting portion (e.g., slide 308). The opposing end of the slide 308 may be configured to be connected to a workbench or other mount, such as a leg or frame thereof, as illustrated. Additionally, as illustrated, a mounting tube 396, may be connected to the opposing end of the slide 308. The mount 396 may have various configurations, such as comprising a tube that can be connected to a support (e.g., a standard wood working table in several orientations (vertically, horizontally, etc.)). Additionally, the primary screw 312 may be coupled to the slide 308 and configured to cause the clamping jaw 306 to move with respect to the mount 396. Additionally, the primary screw 312 may have an axis parallel to the mount 396.

As illustrated in FIG. 12A, one or more locking pins 397 or other connectors may be used to connect the slide 308 to the mount 396, such as in various positions, and connect the mount to the workbench or the like. The pins 397 may have the same diameter as the standard working table dog diameter.

In one embodiment, as indicated at FIG. 12A, the face portion of the jaw 306 may be constructed from wood, wherein a width of the wood face can be changed based on the customer needs. Accordingly, the clamping jaw 306 may be movable with respect to the mount 396 in order to hold a workpiece or tool. Other features of the vise 302 may be the same as the vises 2,102,202.

Figure 12B:
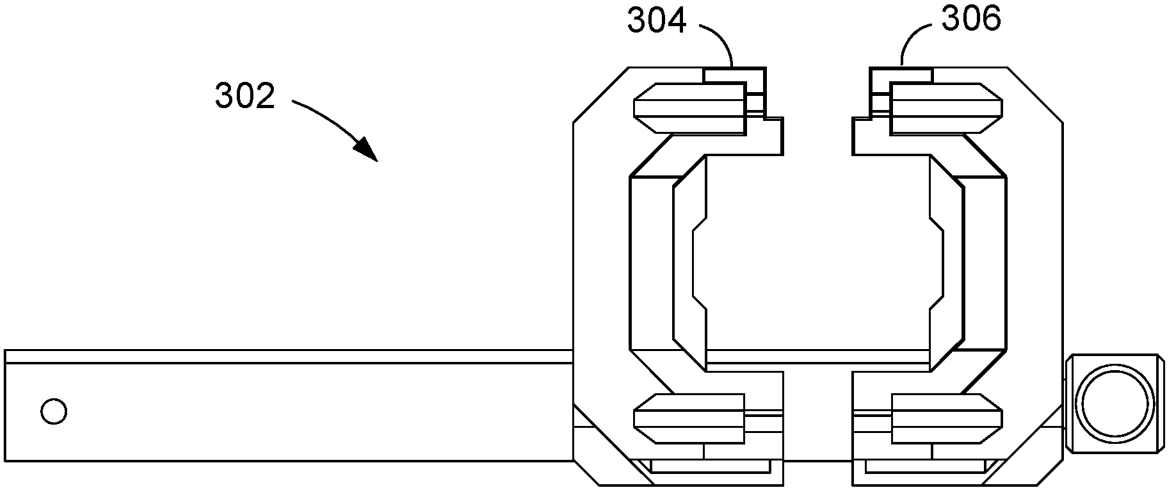

In another example, as shown in FIG. 12B, the vise 302 might include two jaws 304,306, such as if a stand-alone wood clamping vise is desired.

Figure 13:
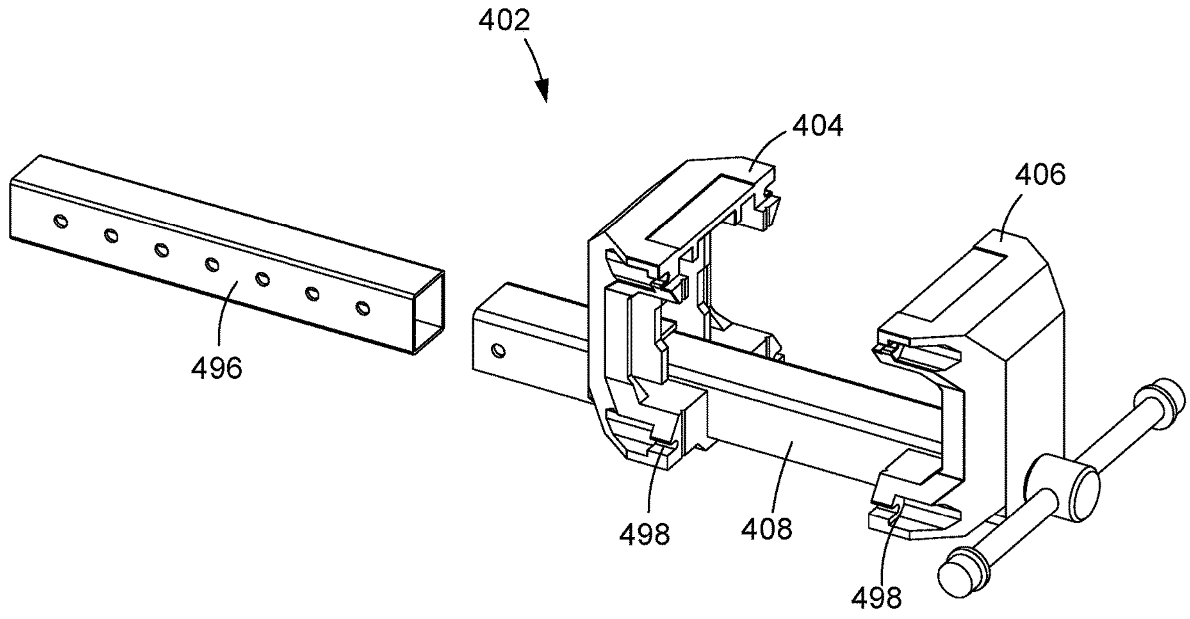
FIG. 13 is an exploded isometric view of another vise, according to another non-limiting embodiment of the disclosed concept.

FIG. 13 shows views of another vise 402 similar to the vises 2,102,202,302 discussed above, wherein like reference numbers represent like components. This vise 402 is particularly configured to be supported by a hitch receiver, such as commonly found on vehicles (but which might be mounted to other supports).

As shown in FIGS. 13, the slide 408 of the vise 402 may extend outwardly beyond the first jaw 404 and may have an end which is sized to fit into a trailer hitch receiver (such as of one or more standard sizes, e.g., a 2×2 inch trailer hitch receiver). In another configuration, the body of the vise 402 might have an extension which is configured to fit into a trailer hitch receiver.

Additionally, as can be appreciated with reference to FIG. 13, the vise 402 might be connected to an extension tube or mount 496 which is then connected to the hitch receiver, thus causing the vise 402 to be set out from the hitch receiver (such as to provide working space). In one configuration, the vise 402 might adjustably connect to the extension 496, such as by a pin which may engage a plurality of spaced apertures in the extension 496, thus allowing the position of the vise 402 to be changed (such as extended out or more for additional clearance).

In the embodiment illustrated, the first and second jaws 404,406 may have the same general configuration. However, either jaw might include an anvil option.

As shown in FIG. 13, a groove 498 may be located in the clamping faces of the jaws 404,406. For example, the grooves 498 may be vertically extending and be located in the bottom clamping portions (on either side of the slide 408) and/or top clamping portions of the jaws. The groove 498 may help with alignment and prevent slipping when clamping non uniform parts.

Figure 14A:
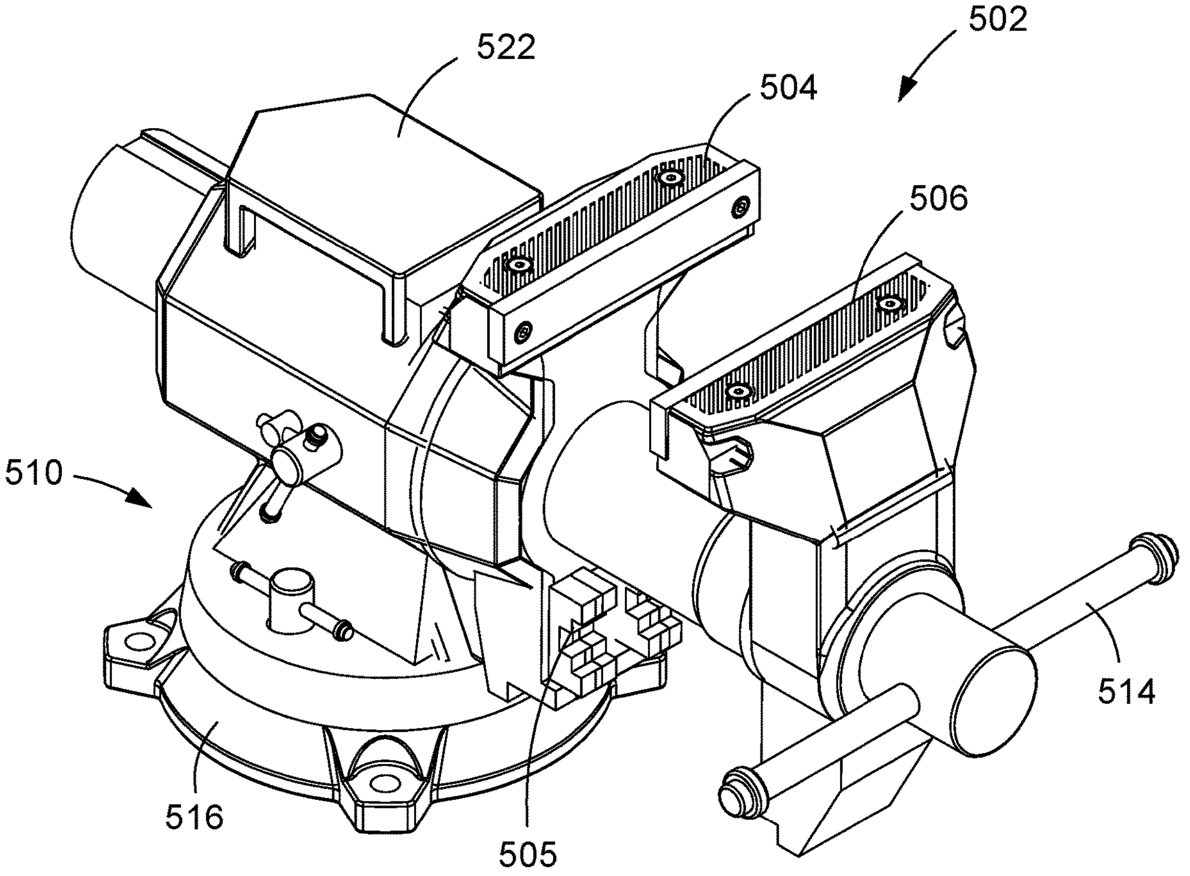
FIGS. 14A, 14B, and 14C are front isometric, top, and front views, respectively, of another vise, according to another non-limiting embodiment of the disclosed concept.
Figure 14B:
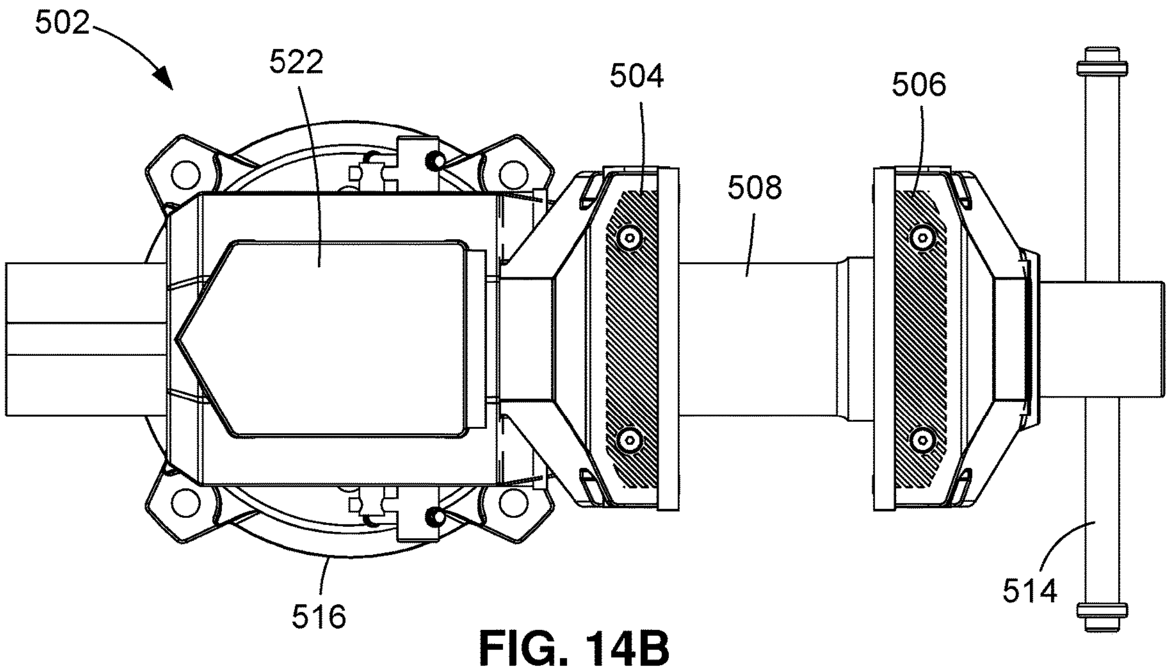
Figure 14C:
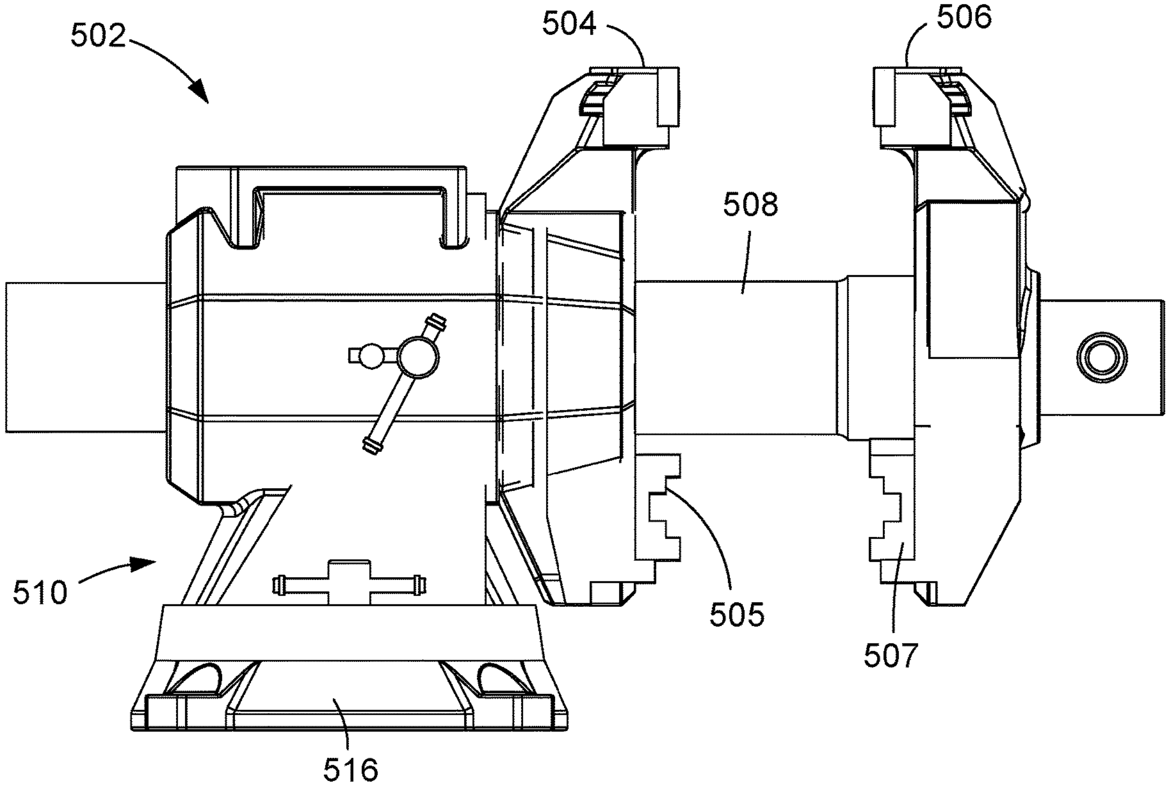

FIGS. 14A, 14B, and 14C show different views of another vise 502, similar to the vises 2,102,202,302,402, wherein like numbers represent like features. As shown, the first and second clamping jaws 504,506 face each other, and an anvil having a working surface 522 extends outwardly from the first clamping jaw 504. As shown in FIG. 14C, the first and second clamping jaws 504,506 may each have corresponding grooved, stepped or offset surfaces 505,507 for effectively gripping or clamping workpieces.

The vise 502 may again comprise a body 510, such as for supporting the fixed first jaw 504. This body 510 may be rotatably mounted to a base 516, such as to permit 360 degree rotation of the vise relative to the base 516 (which may be connected to a mounting surface). Such a rotational mounting may be similar to that described relative to the vise 2 and shown in FIG. 8.

Again, the second clamping jaw 506 is preferably movable relative to the first clamping jaw 504, such as on a slide (which is generally circular in shape in this example) via movement of a handle 514 which turns a spindle (not visible).

Figure 15A:
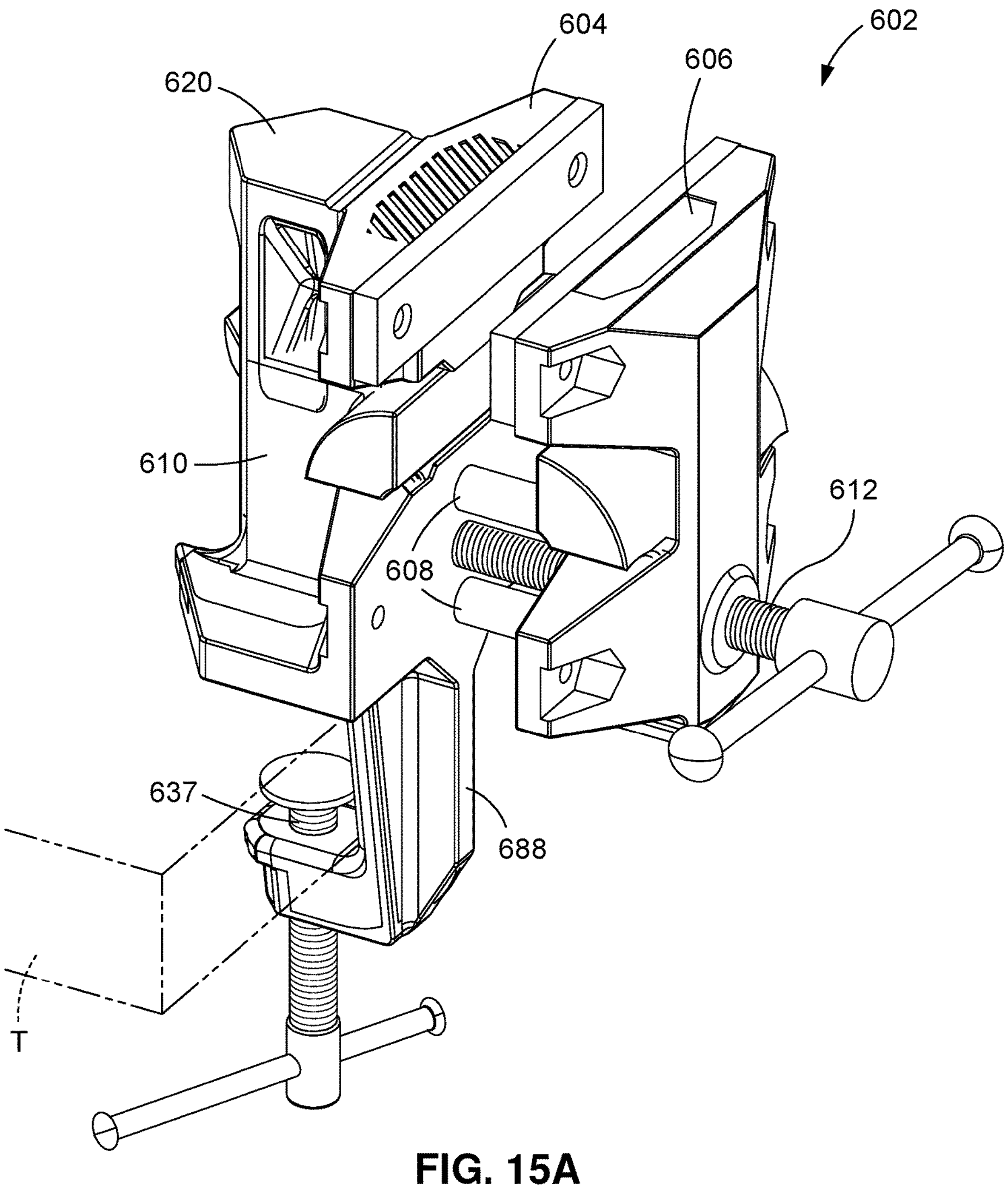
FIGS. 15A, 15B, and 15C are front isometric, top, and front views, respectively, of another vise, according to another non-limiting embodiment of the disclosed concept.
Figure 15B:
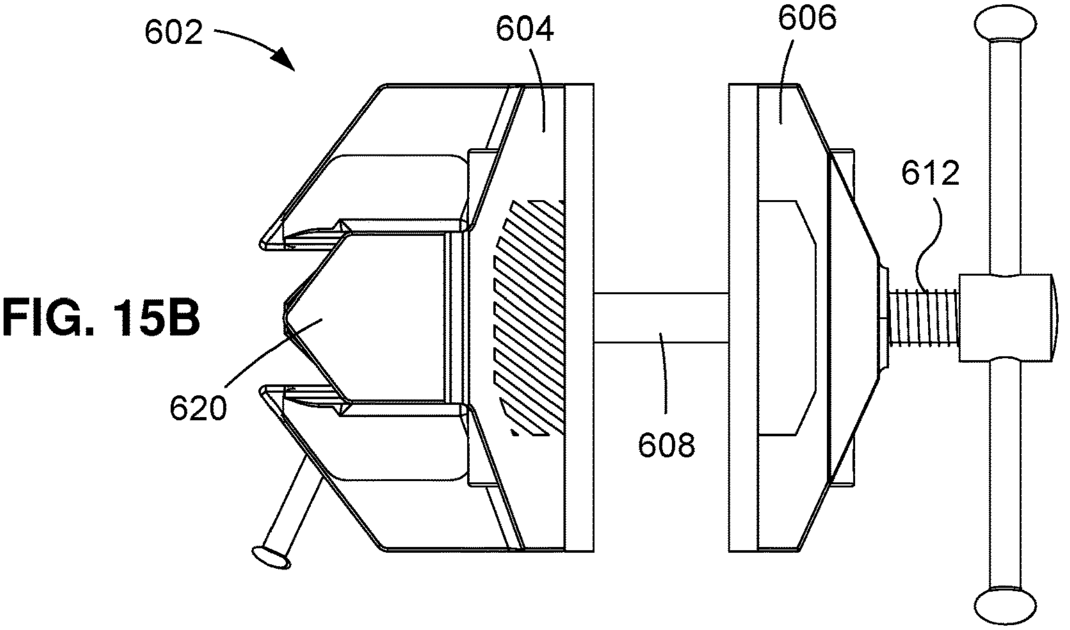
Figure 15C:
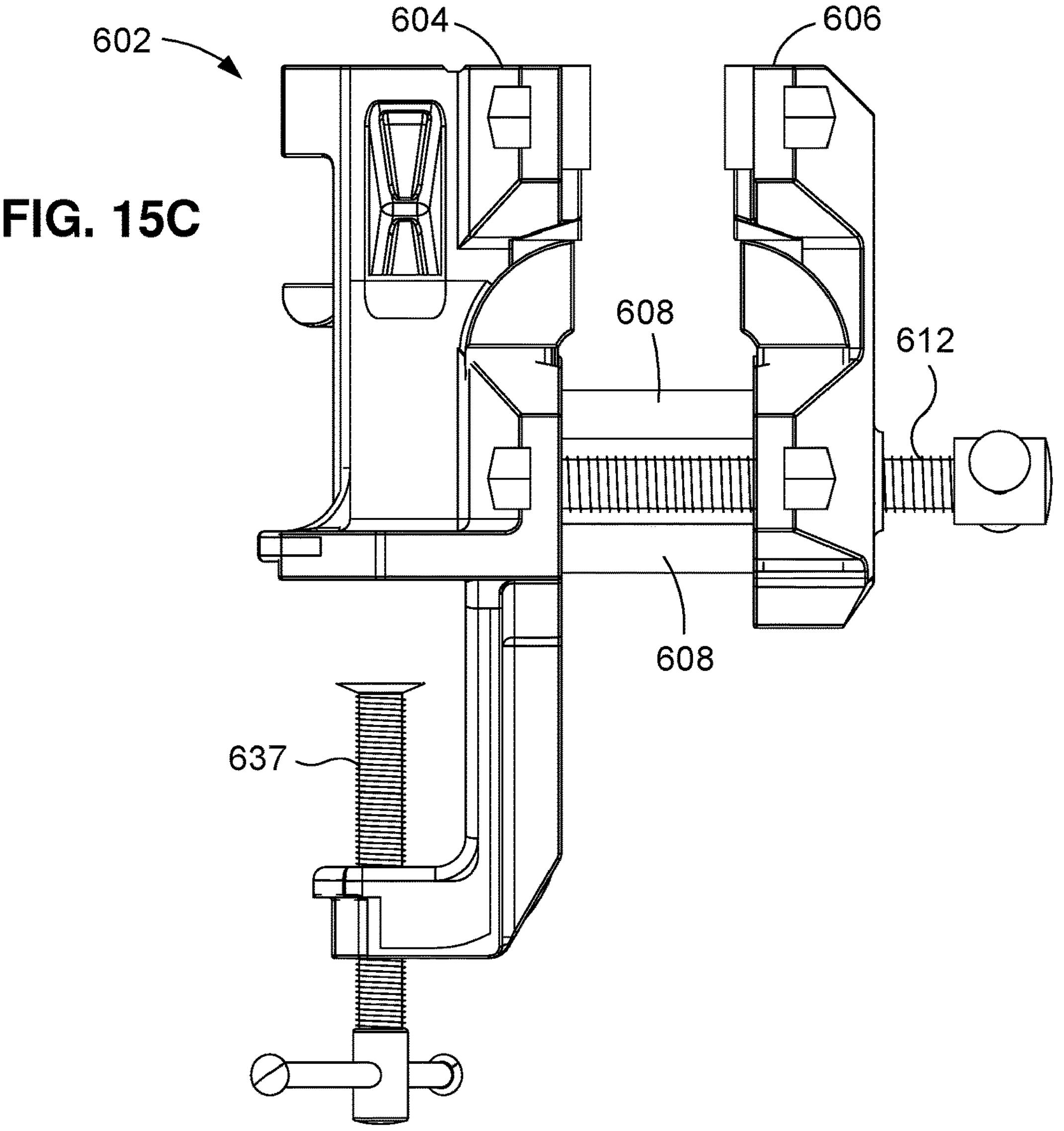
Figure 16A:
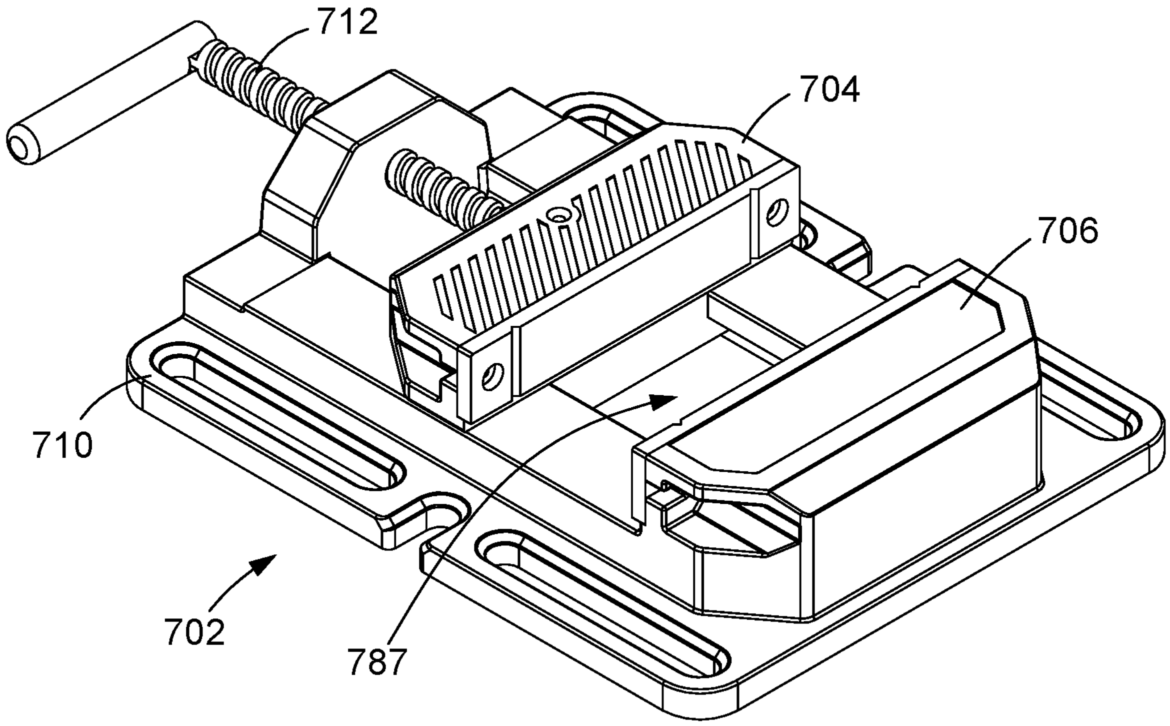
FIGS. 16A, 16B, 16C, 16D, are a front right isometric, a front left isometric, a top, and a front view, respectively, of another vise, according to another non-limiting embodiment of the disclosed concept.
Figure 16B:
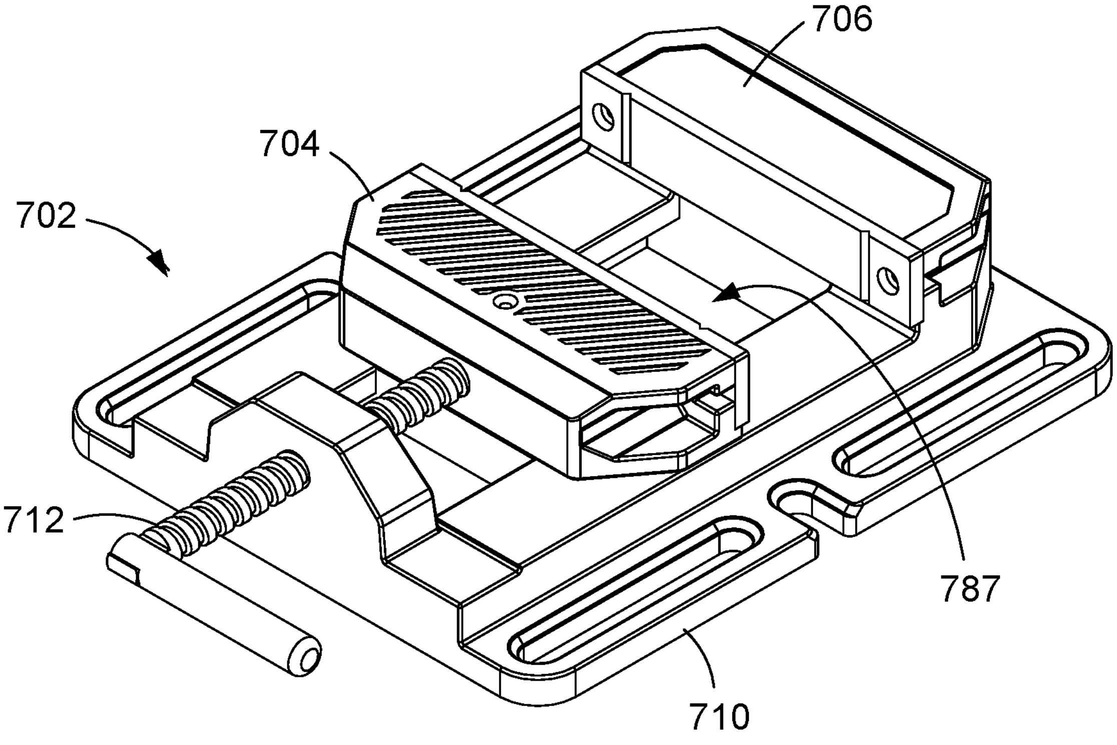
Figure 16C:
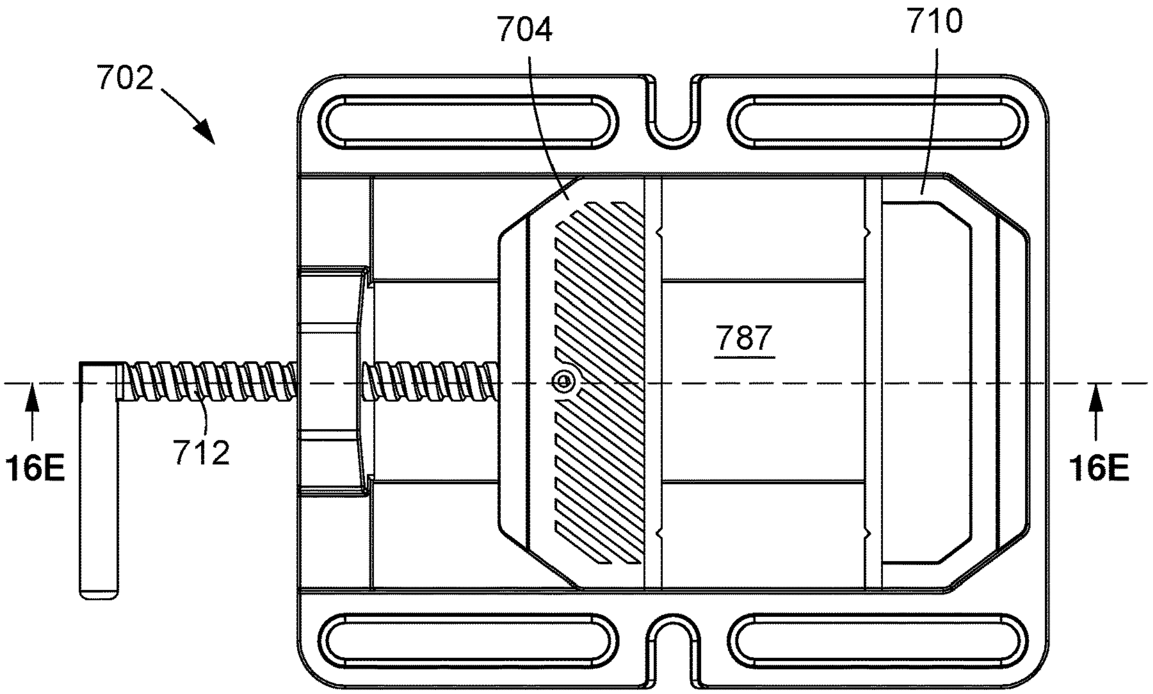
Figure 16D:
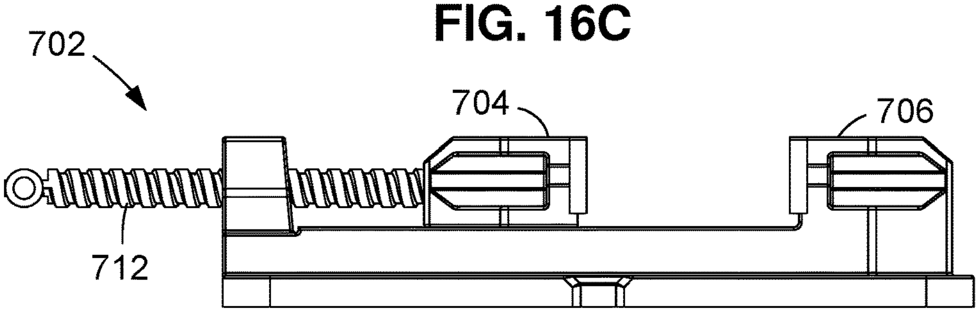
Figure 16E:
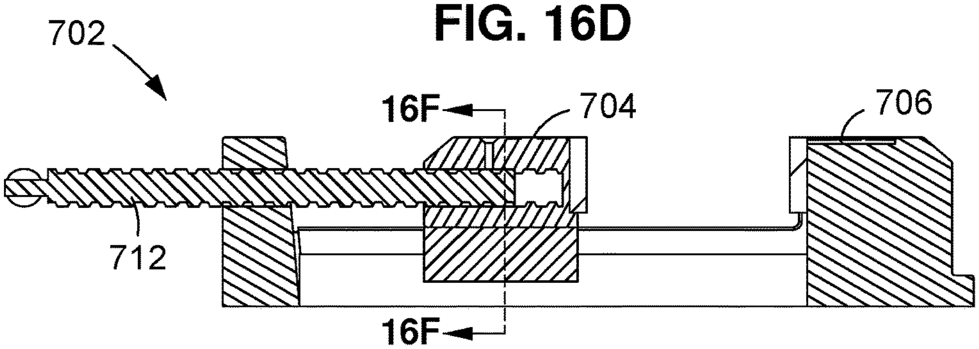
FIG. 16E is first sectional view of the vise illustrated in FIG. 16C, taken in the direction of line 16E-16E therein.
Figure 16F:
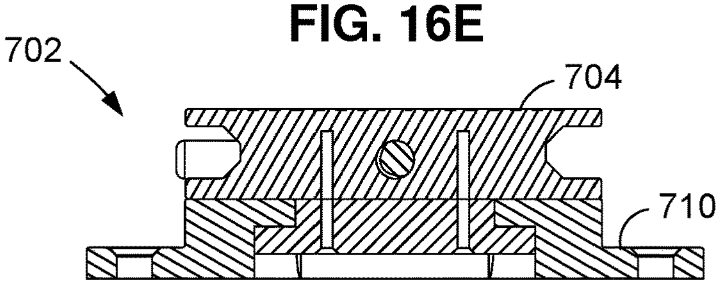
FIG. 16F is a second sectional view of the vise illustrated in FIG. 16E taken along line 16F-16F therein.

FIGS. 15A, 15B, and 15C show different views of another vise 602, similar to the vises 2,102,202,302,402,502, wherein like numbers represent like features. This vise 602 is similar to the vise 102 illustrated in FIG. 10A, except that the mounting orientation is reversed (a secondary mounting screw 637 extends upwardly to a base portion 610 of the vise 102 along an extension 688).

Once again, turning of a primary screw 612 is configured to move the first and second clamping jaws 604,606 toward and away from one another such as by movement of the second movable jaw 606 along a pair of slides 608.

As shown, in this configuration, the first jaw 604 and an associated anvil 620 may be relatively compact in depth-dimension, such as being located generally above the extension 688 and secondary screw 637, and where the second jaw 606 is similarly compact, thus causing the entire vise 602 to be smaller in dimension (particularly in the direction parallel to the primary screw 612).

This vise 602 may, for example, be mounted to the edge of a workbench, table T or counter, such that the first and second jaws 604,606 are located outwardly from the edge thereof for clamping workpieces.

FIGS. 16A-16F show different views of another vise 702, similar to the vises 2,102,202,302,402,502,602 wherein like numbers represent like features. This particular vise 702 has particular utility as a drill press vise, such as there a generally planar base 710 may be mounted to a work bench or surface (such as via fasteners extending through associated mounting holes in the base 710). The base 710 preferably defines an opening 787 therethrough, such as generally centrally between the first and second jaws 704,706, so that when a workpiece is clamped by the jaws and a drill bit or the like is pressed downwardly through the workpiece, the drill bit does not engage the base 710, but instead passes into that opening.

Once again, the first and second jaws 704,706 are mounted for relative movement. In this case, the second jaw 706 may be fixed, such as being a portion of the base 710, while the first jaw 704 may be movable relative thereto. In this case, the first jaw 704 may be movably mounted to the base 710, such as by being mounted to a track or guide of the base 710 and/or, in other variations, by one or more guide tubes (similar to that show in FIG. 1 relative to vise 2). Movement of the first or moveable jaw 704 might be effected, for example, by turning an associated primary screw 712 which is connected to the first jaw 704 and engages the base 710.

Preferably the jaws 704,706 are low-profile (have minimal height) so as to easily fit under a drill press or the like.

Figure 17A:
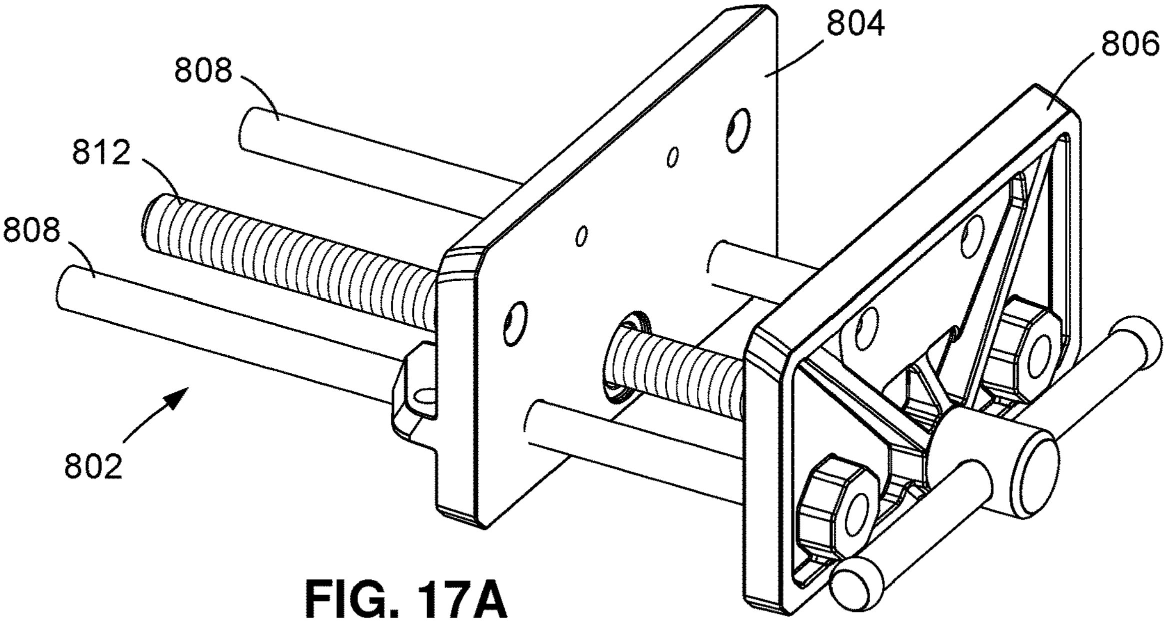
FIGS. 17A, 17B, and 17C are isometric, top, and front views, respectively, of another vise, according to another non-limiting embodiment of the disclosed concept.
Figure 17B:
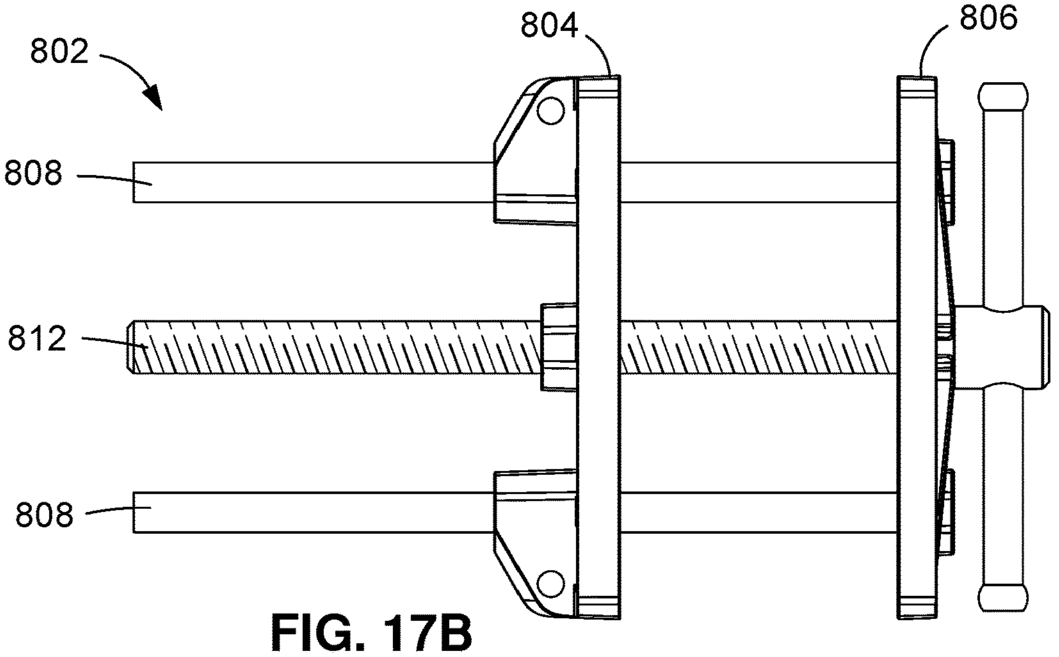
Figure 17C:
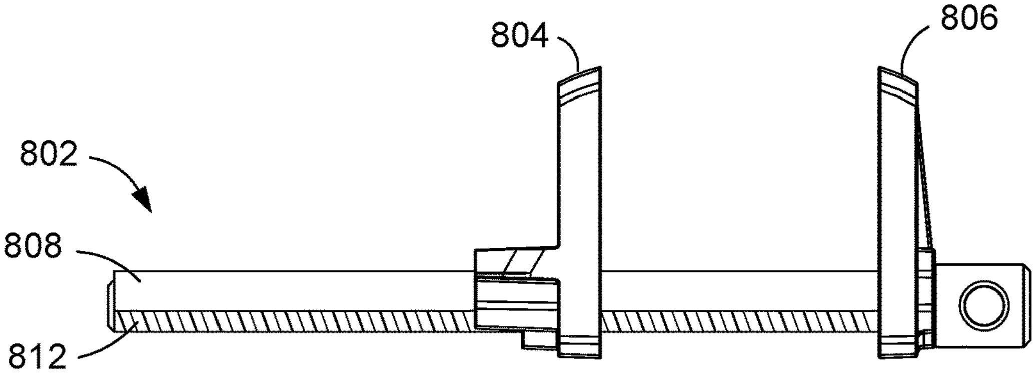

FIGS. 17A-17C show different views of another vise 802, similar to the vises 2,102,202,302,402,502,602,702 wherein like numbers represent like features. As shown, the vise 802 includes the first and second clamping jaws 804,806, a primary screw 812 for moving the first and second clamping jaws 804,806 toward and away from one another. Additionally, in one example, the vise 802 further includes first and second guide rods 808 extending through each of the first and second clamping jaws 804,806 for stabilizing the clamping jaws 804,806 as they are moved. This particular vise 802 may be used in a free-standing configuration, such as where it is used to press or clamp two pieces of wood together when being glued, etc. As such, as illustrated, the jaws 804, 806 may be relatively planar—or at least define planar working faces. Further, the jaws may define one or more openings, such as to allow a fastener to pass therethrough into engagement with the one or more workpieces to further secure them.

As indicated above, the vise jaws may have various configurations, including replaceable jaw faces, such as having different shapes or made of different materials. In one embodiment, one or more clamping portions of the jaws, such as the upper clamping portions of both jaws, might have a fractal configuration. In such a configuration, the faces of the clamping portion may be defined by a plurality of individual elements, which elements are movable independent of one another, such as in and out relative to a body of the jaw. In this manner, the jaw face can "conform" to the shape of different objects which it engages.

It will be appreciated that the various features of the vises described above may be applied to one another or other types of vises. Further, features of the invention may be applied to other devices. For example, the "C" shaped vise jaw might be adapted to various types of clamps which include moving or fixed clamp elements (such as mounted on a slide, etc.), wherein the shapes of the clamps may similarly be "C" shaped as described above.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A vise comprising:

a pair of clamping jaws defining a cavity therebetween for holding a workpiece or tool, the pair of clamping jaws including a first clamping jaw with a first body, a first jaw face removably coupled to the first body, and a first open slot formed in a side of the first body such that a first ear is formed at an end of the first open slot;

a fastener disposed in the first open slot and extending through the first ear and into engagement with the first jaw face, thereby removably connecting the first jaw face to the first body;

a primary screw for moving the pair of clamping jaws toward and away from one another, thereby allowing a workpiece or tool to be clamped in a first direction; and an anvil extending outwardly from the first clamping jaw.

2. The vise according to claim 1, wherein a second open slot is formed in another side of the first body, wherein a second ear is formed at an end of the second open slot, wherein the vise further comprises a second fastener disposed in the second open slot and extending through the second ear, and wherein the pair of clamping jaws further comprises a second clamping jaw configured the same as the first clamping jaw.

3. The vise according to claim 1, wherein the anvil has a work surface, and wherein the first clamping jaw has a top surface that is parallel with the work surface.

4. The vise according to claim 3, wherein the vise further comprises a body connected to the first clamping jaw, and a base connected to the body, and wherein the body is configured to support the anvil and allow the anvil to be squared with a structure on which the anvil is mounted.

5. The vise according to claim 4, wherein the base comprises a mounting plate and a locking bar connected to the mounting plate, wherein each of the mounting plate and the locking bar have a plurality of teeth, and wherein the teeth of the mounting plate engage the teeth of the locking bar in order to minimize the likelihood that the locking bar will become disengaged from the mounting plate.

6. The vise according to claim 5, wherein the locking bar further comprises an element and a rib extending outwardly from the element in order to strengthen the locking bar, and wherein the plurality of teeth of the locking bar extend outwardly from the element.

7. The vise according to claim 5, further comprising a lever movably mounted to the body and configured to adjust a position of the locking bar with respect to the mounting plate.

8. The vise according to claim 7, wherein the work surface is disposed in a plane, and wherein the lever is configured to rotate about an axis perpendicular to the plane.

9. The vise according to claim 5, wherein the mounting plate is annular-shaped.

10. The vise according to claim 3, wherein the work surface and the top surface are separated by a groove.

11. The vise according to claim 3, wherein the anvil has a support extending from proximate the work surface away therefrom, and wherein the support has an I-shaped cross-section.

12. The vise according to claim 3, wherein the work surface has an edge and a corner disposed opposite the edge, and wherein the edge is disposed between the corner and the first clamping jaw.

13. The vise according to claim 1, wherein the vise further comprises a body connected to the first clamping jaw, and wherein the body comprises an extension and a mount extending generally perpendicular to the extension.

14. The vise according to claim 13, wherein the vise further comprises a secondary screw extending through the mount in order to allow the vise to be clamped to a support, wherein the primary and secondary screws each have an axis, and wherein the axis of the primary screw is disposed perpendicular to the axis of the secondary screw.

15. The vise according to claim 14, further comprising a pad extending from an end of the secondary screw in order to protect the support.

16. The vise according to claim 1, wherein each of the pair of clamping jaws is generally C-shaped such that the pair of clamping jaws are each concave facing each other.

17. The vise according to claim 1, wherein the pair of clamping jaws further comprises a second clamping jaw, wherein the first and second clamping jaws each comprise a first clamping surface, a second clamping surface spaced from the first clamping surface, and a third clamping surface spaced from the first and second clamping surfaces, and wherein the first, second, and third clamping surfaces of the first clamping jaw are configured to face the first, second, and third clamping surfaces of the second clamping jaw, respectively.

18. A vise comprising:

a pair of clamping jaws defining a cavity therebetween for holding a workpiece or tool;

a primary screw for moving the pair of clamping jaws toward and away from one another, thereby allowing a workpiece or tool to be clamped in a first direction;

an anvil extending outwardly from a first clamping jaw of the pair of clamping jaws, the anvil having a work surface that is parallel with a top surface of the first clamping jaw;

a body connected to the first clamping jaw; and a base connected to the body and configured to support the anvil and to allow the anvil to be squared with a structure on which the anvil is mounted, the base having:

a mounting plate with an element, a rib extending outwardly from the element in order to strengthen the locking bar, and a first plurality of teeth extending outwardly from the element, and a locking bar connected to the mounting plate and having a second plurality of teeth, wherein the second plurality of teeth engage the first plurality of teeth in order to minimize the likelihood that the locking bar will become disengaged from the mounting plate.

19. A vise comprising:

a pair of clamping jaws defining a cavity therebetween for holding a workpiece or tool;

a primary screw for moving the pair of clamping jaws toward and away from one another, thereby allowing a workpiece or tool to be clamped in a first direction; and an anvil extending outwardly from a first clamping jaw of the pair of clamping jaws, the anvil having a work surface that is parallel with a top surface of the first clamping jaw and that is disposed in a plane;

a body connected to the first clamping jaw;

a base connected to the body and configured to support the anvil and to allow the anvil to be squared with a structure on which the anvil is mounted, the base having a mounting plate with a first plurality of teeth, and a locking bar connected to the mounting plate with a second plurality of teeth, wherein the second plurality of teeth engage the first plurality of teeth in order to minimize the likelihood that the locking bar will become disengaged from the mounting plate; and a lever movably mounted to the body, configured to rotate about an axis perpendicular to the plane, and configured to adjust a position of the locking bar with respect to the mounting plate.

* * * * *